United States Patent
Pfeuffer

(10) Patent No.: US 6,203,199 B1
(45) Date of Patent: Mar. 20, 2001

(54) LINEAR GUIDE DEVICE

(75) Inventor: Viktor Pfeuffer, Wurzburg (DE)

(73) Assignee: Deutsche Star GmbH, Schweinfurt (DE)

( * ) Notice: Subject to any disclaimer, the term of this patent is extended or adjusted under 35 U.S.C. 154(b) by 0 days.

(21) Appl. No.: 09/343,014

(22) Filed: Jun. 29, 1999

(30) Foreign Application Priority Data

Jul. 6, 1998 (DE) ............................................. 198 30 140

(51) Int. Cl.⁷ .............................. F16C 29/06; F16C 33/10
(52) U.S. Cl. .................................................. 384/45; 384/13
(58) Field of Search .................................. 384/13, 15, 45, 384/44, 43

(56) References Cited

U.S. PATENT DOCUMENTS

| | | |
|---|---|---|
| 4,743,124 | 5/1988 | Blaurock . |
| 4,850,720 | 7/1989 | Osawa . |
| 5,139,347 | 8/1992 | Hattori . |
| 5,399,023 | 3/1995 | Winkelmann et al. . |
| 5,445,455 | 8/1995 | Holweg . |
| 5,509,736 | 4/1996 | Keller et al. . |
| 5,547,285 | 8/1996 | Hutzel et al. . |
| 5,570,958 | * 11/1996 | Tsukada ................................... 384/45 |
| 5,582,486 | 12/1996 | Tsukada . |
| 5,678,927 | * 10/1997 | Yabe et al. ............................. 384/13 |
| 5,694,811 | * 12/1997 | Tsukada ............................. 384/13 X |
| 6,024,490 | * 2/2000 | Shirai ...................................... 384/13 |

FOREIGN PATENT DOCUMENTS

| | | |
|---|---|---|
| 3012018A | 10/1981 | (DE) . |
| 44 24 795 | 9/1995 | (DE) . |
| 4415704A | 11/1995 | (DE) . |
| 19518834A | 11/1996 | (DE) . |
| 19754454A | 6/1998 | (DE) . |
| 198 28 587A | 1/1999 | (DE) . |
| 0120093A | 10/1984 | (EP) . |
| 0 874 172 | 10/1998 | (EP) . |
| 62-15623 | 1/1987 | (JP) . |
| 64-25525 | 2/1989 | (JP) . |
| 219927 | 1/1990 | (JP) . |
| 571443 | 9/1993 | (JP) . |

* cited by examiner

Primary Examiner—Charles A Marmor
Assistant Examiner—Roger Pang
(74) Attorney, Agent, or Firm—Baker Botts L.L.P.

(57) ABSTRACT

A linear guide device comprises a guide carriage having two end assemblies (32, 34, 36) arranged on the front ends of the guide carriage. The guide carriage is guided on a guide rail in the direction of the longitudinal axis of the device by means of rolling member loops (S1, S2). Within the end units (32) of the end assemblies (32, 34, 36) are provided parts of reversing guides for arcuate rows of rolling members of the rolling member loops (S1, S2). A lubricant path system (110, 114, 116, 120) is provided within the guide carriage for satisfying a lubricant demand existing on the roll surfaces of the linear guide device. The lubricant path system includes, in a boundary region between an end unit (32) and a carriage main body, a lubricant oil supply capillary line (110) extending in circumferential direction of the guide rail and being formed of a suction member. The lubricant oil supply capillary line supplies lubricating oil to a licking region (114) irrespective of the existence of a pressure difference. The suction member (110) is in licking contact with the rolling members (58) of the rolling member loops (S1, S2) or with a bearing track of the guide rail in the licking region.

54 Claims, 12 Drawing Sheets

LINEAR GUIDE DEVICE

BACKGROUND

The present invention relates to a linear guide device, comprising a guide rail having a longitudinal axis, at least one guide carriage guided on the guide rail in the direction of the longitudinal axis by means of at least one rolling member loop circulating in a circulation space of the guide carriage, said rolling member loop including a bearing row of rolling members in simultaneous engagement with a bearing track of the guide rail and a bearing track of the guide carriage, a further returning row of rolling members and two arcuate rows of rolling members, said guide carriage comprising a carriage main body in the longitudinal region of the bearing row of rolling members and end units at the axially spaced ends of the carriage main body, reversing guides for the arcuate rows of rolling members being formed at least partly on the end units, a lubricant demand existing on at least a part of the roll surfaces of the linear guide device and a lubricant path system being provided in the guide carriage for satisfying said lubricant demand, said lubricant path system extending from a lubricant supply space of the guide carriage to roll surfaces, said lubricant path system being accommodated at least in part in a boundary region between at least one end unit and the carriage main body.

Such linear guide devices are known from EP 0 211 243 A2, U.S. Pat. No. 4,850,720, DE 42 10 299 C2 and DE 44 24 795 A1. In these known embodiments, the lubricant path system comprises in its end portion close to the rolling members a lubricant channel within a radially inner reversing member of a reversing guide. This lubricant channel terminates into a reversing surface of the reversing member and thus into the circulation space of the rolling members.

According to U.S. Pat. No. 4,850,720, the outlet opening of the lubricant channel extending within the radially inner reversing member is formed as a throttle valve in the form of a narrow-sized bore which extends from the lubricant channel in radial direction to the radially inner reversing surface of the reversing member.

According to DE 42 10 299 C2, at the outlet zone of the lubricant channel into the radially inner reversing surface relief pressure valves are provided which open as the lubricant pressure is increased but prevent lubricant from flowing off under the influence of gravity. This embodiment is said to be especially suited if low-viscosity oil is used as the lubricant. According to this embodiment, the relief pressure valves are provided directly at the outlet into the circulation space of the rolling members, i.e. at the radially inner reversing surface of the reversing member.

According to DE 44 24 795 A1 the lubricant oil flows out into the circulation space of the rolling members through outlet channels of the radially inner reversing member, which outlet channels terminate into the radially inner reversing surface of the reversing member. These outlet channels begin within a common throttle chamber which receives a foam material strip. Upon transmission of a lubricant oil pulse, the oil penetrates the open-cell foam material which serves as a throttle means. The foam material has no contact with the rolling members. After having penetrated the foam material, the lubricant oil flows through the outlet channels from the throttle chamber into the circulation space, as a consequence of a pressure pulse. The foam material strip prevents oil from flowing out into the circulation space if no pressure pulse has been applied. With this embodiment, it is not excluded that, caused by one or a plurality of consecutive pressure pulses, too much oil gets into the circulation space. There is the that lubricant oil might flow out into the ambient if the circulation space has not been made oil-tight. On the other hand, there will also be the danger that too little lubricant oil is availabe for the circulating rolling members if the lubricant oil contained in the circulation space has been consumed prematurely between two consecutive pressure pulses. The technical problem underlying the present invention is to take care in case of the use of lubricant oil that sufficient lubricant oil is always and over a long period of time available in the circulation space and to simultaneously take care that no lubricant oil quantities beyond the respective lubricant demand get into and possibly out of the circulation space.

SUMMARY

The present invention suggests as solution to this technical problem that a lubricant oil supply line, which is connected to the lubricant supply space and, which extends at least in part in the boundary region approximately in circumferential direction of the guide rail, be formed at least along a part of its length of a lubricant oil supply capillary line which supplies lubricant oil irrespective of the existence of a pressure difference, said lubricant oil supply capillary line being in licking contact in at least one licking region with rolling members of said at least one rolling member loop or with the bearing track of the guide rail.

When speaking of a lubricant supply space, the volume and the shape of the lubricant supply space is completely left out of account. The lubricant supply space may consist of one or of a plurality of chambers, but it may also be simply formed of an upstream part of the lubricant path system. Furthermore, there should not exist any restrictions as to the manner of lubricant fill and refill. It is possible to periodically fill lubricant oil into the lubricant supply space, possibly through a grease nipple designed as a check valve. It is also possible to have a life-long charge filled into the lubricant supply space before use on the manufacturer side or on the user side.

According to the solution suggested by the present invention, the rolling members lick the lubricant oil from the lubricant oil supply capillary line in the respective licking region when the rolling members roll along this licking region. According to an alternative suggestion, the lubricant oil is licked from the lubricant oil supply capillary line in the respective licking region by the track of the guide rail when the guide carriage moves along the guide rail. In any case, lubricant oil can get to the rolling members or to the track of the guide rail, respectively, always and only if there is a relative movement between the licking region of the lubricant oil supply capillary line, on the one hand, and the rolling members or the bearing track of the guide rail, on the other hand. Either on account of its great lubricant-saturated volume or on account of its communication with free lubricant oil within the lubricant supply space, the lubricant oil supply capillary line is suited to safeguard long-term lubrication of the rolling members or of the bearing track of the guide rail, respectively, to the required extent. Of course, when constructing the linear guide device, one will have to take care by the setting of various parameters, such as the permeability of the lubricant oil supply capillary line, the cross-section of this capillary line, the viscosity of the lubricant oil and the dimensions of the contact region between the capillary line and the rolling members or the bearing track of the guide rail, that sufficient lubrication is guaranteed during operation. The risk of overfilling of the circulation space with lubricant oil, which might cause undesired outflow of lubricant oil from the circulation space, does not exist with this suggestion of the invention. In contrast to the known valve solutions, the feeding action of the lubricant oil supply capillary line is not based upon a pressure difference but upon an oil saturation gradient within the capillary material. This saturation gradient is caused by the fact that oil is removed within the licking region from the lubricant oil supply capillary line and the thus caused oil impoverishment within the licking region is continuously compensated by oil coming from the lubricant supply space. As the oil supply is thus principally independent from the oil pressure, there will not be any gravity-related varying supply to individual lubrication points. All lubrication points will rather be provided evenly with lubricant oil, as determined before. Possible excess pressure within the lubricant supply space will in general not cause excess oil in the circulation space, as the lubricant oil supply capillary line, due to its normally great length, does not cause throughflow towards the circulation space at least in case of short-term excess pressure within the lubricant supply space, but at best an oil accumulation in the upstream section of the lubricant oil supply capillary line.

The lubricant oil supply system of the present invention is subject to self-regulation inasmuch as in case of lubricant oil impoverishment in the rolling members-close region of the lubricant oil supply capillary line by intensive lick-off of lubricant oil, the saturation gradient in the lubricant oil supply capillary line becomes greater and thus also the lubricant oil feed. This self-regulating effect is still promoted by the fact that in case of oil impoverishment at the surface of the rolling members or of the rail-side track, there is a greater adhesive effect in the sense of greater lubricant oil removal from the licking region of the capillary line.

Principally, the length of the lubricant oil supply capillary line is not subject to restrictions. Wherever a section of the lubricant oil supply capillary line is close by, possible free lubricant oil quantities may be expected to be absorbed in case of proper rating of absorbency and prevention or minimization of lubricant oil pockets not filled with capillary material; so, the sealing problem in the boundary region between the end unit and the carriage main body is eliminated or farly minimized.

The lubricant oil supply capillary line may be formed of an absorbent textile material, such as felt. Furthermore, it may consist of an open-cell or open-pore absorbent material. Open-cell foam material, especially of polymer plastics material, is especially suited. With these materials, the lubricant oil transport is achieved by means of the capillary effect within the capillaries or pores of the respective material, irrespective whether or not a pressure gradient from outside has been applied. Under certain circumstances, such a pressure gradient may promote the lubricant oil transport in the lubricant oil supply capillary line. It is however not of decisive importance therefor. If, in addition to the oil quantity absorbed by the lubricant oil supply capillary line, the lubricant path system contains an additional quantity of free oil forming a stock of oil within the lubricant path system, the lubricant oil supply capillary line absorbs as much oil from this stock as oil is delivered in the licking region, so that the saturation degree of the lubricant oil supply capillary line is not decreased and there is no risk of reduced lubricaton of the roll surfaces.

An alternative material to form the lubricant oil supply capillary line is a sinter metal, such as sinter bronze. Sinter metals are highly wear-resistant; so they can be used for the formation of track surfaces along which the rolling members of the rolling member loops ride within the circulation space.

From DE 30 12 018 A1, it is known to accomplish lubrication of a rolling member loop in roller bearings for lengthwise movements by forming a part of the inner surface of the circulation space by a guide border consisting of an elastic lubricant-releasing porous material. This publication does however not make any mention how the lubricant is fed to the porous material border.

As in the afore-mentioned prior art systems, the guide carriage may be substantially U-shaped having a web portion adjacent a top surface of the guide rail a and flange portion adjacent each side surface of the guide rail. The bearing row of rolling members of at least one rolling member loop is disposed between each of the flange portions and the respective side surface of the guide rail. The lubricant oil supply line extends along the web portion and the flange portions in correspondence to said U-shape. The lubricant oil supply capillary line can then extend at least approximately over the length of the flange portion, and if desired also at least along a part of the web portion. In particular, the lubricant oil supply capillary line may substantially have a U-shaped configuration and extend from the bearing row of rolling members of the at least one rolling member loop of the one flange portion to the bearing row of rolling members of the at least one rolling member loop of the other flange portion. Thus, by means of one single lubricant oil supply capillary line, a plurality of rolling member loops can be provided with oil, especially rolling member loops located in different flange portions of the guide carriage. By the length of the lubricant oil supply capillary line, a certain storing capacity of the capillary line for lubricant oil can be obtained. This storing capacity is preferably designed for long-term use and correspondingly long-term operating phases without refill-related shutdowns. Even if the lubricant path system comprises additional storing rooms for free lubricant, a substantial portion of the total oil quantity contained in the lubricant path system may be bound in the lubricant oil supply capillary line. Under certain circumstances, the storing capacity of the lubricant oil supply capillary line may even be adapted to the life of the linear guide device.

The lubricant supply space is suitably disposed in the web portion of at least one end unit. Furthermore, such accommodation of the lubricant supply space allows equal line lengths to the rolling member loops accomodated within different flange portions of the guide carriage.

It has shown that the running characteristics of the rolling members are not, at least not considerably, affected by the licking contact with the lubricant oil supply capillary line. Therefore, the licking region may have a relatively large surface. A uniform oil supply to all rolling members thereby is enhanced. Preferably, the licking region extends over at least a part, in particular a substantial part; of the length of the bearing or/and returning rows of rolling members. In principle, the lubricant oil supply capillary line may slightly project with its licking region into the circulaton space of the rolling member loops in the manner of a nose. Preferably, the licking region is formed of a track surface of the circulation space. The licking region is then flush with the track surface system of the circulation space so, that any possible unsmoothness caused by the lubricant oil supply capillary line is reduced.

The lubricant path system may at least in part be accommodated in an intermediate plate unit which is disposed between an axial end of the carriage main body and the associated end unit. It is then of advantage for the intermediate plate unit to be formed at least in part of an oil-tight material, in particular a plastics material. For sealing the lubricant path system portions accommodated in the intermediate plate, the intermediate plate unit may abut on the carriage main body and/or on the end unit in a lubricant-tight manner.

The intermediate plate unit may have a recess for at least partial accommodation of the lubricant oil supply capillary line. If the recess is substantially entirely filled with the lubricant oil supply capillary line, at least on a part of its length extending in the circumferential direction of the guide rail, free lubricant flow in the recess, which might cause undesired outflow of lubricant, is impossible. The recess is preferably formed in the intermediate plate unit in a relief-type manner and is opened towards the carriage main body. Communication between the recess and the lubricant supply space preferably accommodated in the end unit, may be simply accomplished by communication openings in the recess.

Manufacturing and mounting works are facilitated if an inner arcuate reversing surface for the respective arcuate row of rolling members is formed on the intermediate plate unit. In particular, a reversing member having the reversing surface is integral with the intermediate plate unit. The intermediate plate unit is preferably a molded plastic part produced according to an injection molding process. To fulfill the high requirements as to the guiding exactness of the reversing surfaces, the intermediate plate unit may be made of a relatively hard plastics material. If the recess is molded into the intermediate plate unit on the side thereof that is facing the carriage main body, the inner arcuate reversing surface is conveniently disposed on the side of the intermediate plate unit that is remote from the relief-type recess.

If, in at least one flange portion of the guide carriage, a plurality of rolling member loops is provided, the lubricant oil supply capillary line should be in licking contact with rolling members of a plurality of rolling member loops.

Sometimes, there may exist the requirement that a linear guide device of the type discussed herein is selectively filled with high-viscosity or low-viscosity lubricant. For an easier understanding, only the terms lubricating grease or lubricating oil will be mentioned hereinafter. With the linear guide device of the present invention, it is principally possible to provide, in addition to the lubricant oil supply capillary line for the feed of lubricating oil, a separate lubricating grease supply line extending from a separate lubricating grease storing space (possibly including a lubricating grease refill nipple) to a separate lubricating grease release point at the circulation space or at the track of the guide rail, respectively. Such a solution should not be excluded within the scope of the present invention.

To satisfy the demand of an alternative lubrication with lubricating grease or lubricating oil, the present invention provides preferably the feature that, in addition to the lubricant oil supply capillary line, the lubricant path system comprises a lubricating grease supply line from the common lubricant supply space to at least one lubricating grease outlet structure separated from the licking region, at which lubricating grease outlet structure of the lubricating grease supply line terminates into the circulation space or into the track of the guide rail. It is then possible that the lubricating grease supply line and the lubricant oil supply capillary line extend parallel to each other at least along a part of their length, said lubricant oil supply capillary line forming at least a part of the cross-sectional periphery of the lubricating grease supply line. The situation is as follows: If the lubricating oil supply line and the lubricating grease supply line start out from a common lubricant supply space, the lubricating grease supply line is principally available also for lubricating oil if no other measures thereagainst have been provided. However, it cannot be tolerated that oil flows out freely through the lubricating grease path, neither into the circulation space of the rolling member loop nor to the track of the guide rail. The flow of free lubricating oil through the lubricating grease path can be prevented by the provision of a shut-off portion within the lubricating grease path, which shut-off portion will be opened as lubricating grease pressure is generated when lubricating grease is refilled and which cannot be penetrated by lubricating oil as the lubricating oil—as mentioned before—does not require conveying pressure and furthermore as little pressure is sufficient for the refilling of the lubricating oil. It cannot be excluded that non-bound lubricating oil is present in the lubricating grease path up to the shut-off portion, especially if lubricating oil is refilled.

In this case it has shown to be of advantage if the cross-sectional periphery of the lubricating grease supply line is at least partly formed of the lubricant oil supply capillary line, as then absorption of unbound lubricating oil from the lubricating grease supply line into the lubricant oil supply capillary line is possible. This absorbing effect can be increased if the lubricating grease supply line extends at least along a part of its length in a slit of the lubricant oil supply capillary line. Alternatively, the lubricating grease supply line may extend within a relief-type recess of the lubricant oil supply capillary line or may be entirely enclosed by the latter.

The lubricant oil supply capillary line can at least partly be accommodated in an intermediate plate unit which forms an inner reversing member in the region of an arcuate row of rolling members, said lubricating grease supply line, in prolongation of a line section thereof which is at least partly confined by the lubricant oil supply capillary line, being prolongated within the reversing member up to at least one lubricating grease outlet structure. If the reversing member is common to a plurality of rolling member loops, it is recommended to branch off the lubricating grease supply line towards a plurality of rolling member loops within the reversing member. It is especially favorable if the reversing member comprises a lubricating grease outlet structure between two adjacent reversing surfaces for neighboring rolling member loops. The branching of the lubricating grease supply line is then made only shortly before the rolling member loops to be lubricated; thus, almost identical lubrication of the rolling member loops is ensured.

The said shut-off portion of the lubricating grease supply line is preferably provided upstream of the lubricating grease outlet structure. The lubricating grease outlet structure itself need not be provided with an additional throttle or shut-off valve, as the lubricating grease, owing to its high viscosity, cannot escape unwatched towards the circulation space or towards the track of the guide rail, respectively. Displacement of the lubricating grease shut-off portion to a position upstream of the lubricating grease outlet structure is considered advantageous in constructional respect. If the shutoff portion is no longer provided directly at the outflow to the circulation space or the track of the guide rail, respectively, one may want to provide the shut-off portion at the most convenient place for a simple design of a tight shut-off portion.

It may be desirable also to provide for communication between the lubricating grease supply line and the lubricant oil supply capillary line downstream of the shut-off portion as then lubricating oil that has inadvertently flowed through the shut-off portion will be absorbed by the lubricant oil supply capillary line downstream of the shut-off portion.

One may provide that the guide carriage comprises a plurality of lubricant introduction ports or terminals which can be used selectively for introduction of lubricant, that a valve member is allocated to each of individual ones or groups of lubricant introducton terminals, and that these valve members are independent from one another, so that, when applying a predetermined lubricant introduction pressure to one of the lubricant introduction terminals, only the respective allocated valve member opens. By this measure, the individual lubricant introduction terminals are decoupled from each other. When lubricant is filled in at one of the lubricant introduction terminals, immediate outflow of refilled lubricant at the other lubricant introduction terminals is prevented, as the valve members allocated to the other lubricant introduction terminals remain closed. In such case, the other lubricant introduction terminals need not be closed by blind plugs; this has a cost-saving effect. Preferably, the valve members are mounted on an end unit and/or an intermediate plate unit arranged between the end unit and the carriage main body. The valve members may be especially designed as check valves and may be made of the same material as the end unit or the intermediate plate unit, respectively, and are preferably integral with the end unit or the intermediate plate, respectively.

In principle possible to provide a closed lubricant path system which is not accessible from any site outside of the guide carriage and which is filled once by the manufacturer or by the user with a lubricant quantity sufficient for the entire life of the linear guide device. According to an alternative embodiment, the guide carriage comprises lubricant introduction means which are connected to the lubricant supply space, so that refilling of the lubricant path system is possible. As the various characteristics of lubricating grease and lubricating oil within the region of lubricant introduction are not critical, it is considered space and cost-saving if the lubricant supply space can be charged selectively with lubricating oil or lubricating grease through a common lubricant introduction means.

For the components of the guide carriage, especially for an end unit of the guide carriage, plastics materials are frequently used which facilitate manufacture by a casting or injection molding process. Then, it may occur that the lubricant introduction means are provided on a plastics member, particularly on an end unit of the guide carriage. In such case, it is suggested that the lubricant introduction means comprise a plurality of lubricant introduction terminals and that an armouring member, in particular made of a metal material, be mounted on the plastics member, said armouring member comprising connection components for the lubricant introduction terminals. The resistant material of the armouring member prevents damage to the lubricant introduction terminals, which damage might be caused by improper screwing in place of a lubricating nipple or by improper connection of a lubricant filling device. One may especially provide that the connection components be designed as internal screw sockets each of which is in alignment with a respective connection bore of the lubricant introduction terminals. For lubricant refill, a lubricating nipple can be screwed into the internal screw socket of one of the lubricant introduction terminals, whereas a closing member, e.g. of plastics material, can be inserted, if necessary, into the internal screw sockets of the remaining lubricant introduction terminals.

According to another embodiment, the present invention relates to a linear guide device, comprising a guide rail having a longitudinal axis, at least one guide carriage guided on the guide rail in the direction of the longitudinal axis by means of at least one rolling member loop circulating in a circulation space of the guide carriage, said rolling member loop including a bearing row of rolling members in simultaneous engagement with a bearing track of the guide rail and a bearing track of the guide carriage, further a returning row of rolling members and two arcuate rows of rolling members, a lubricant demand existing on at least a part of the roll surfaces of the linear guide device and a lubricant path system being provided in the guide carriage for satisfying this lubricant demand, said lubricant path system extending from a lubricant supply space of the guide carriage to the roll surfaces. This linear guide device is particularly designed in the way described hereinbefore. This embodiment of the invention requires the features that a lubricating oil supply line and a lubricating grease supply line are connected to the lubricant supply space, that the lubricating oil supply line, on at least a part of its length, is formed of a lubricant oil supply capillary line supplying lubricating oil irrespective of a pressure difference, said lubricant oil supply capillary line being in at least one licking region in licking contact with rolling members of said at least one rolling member loop or with the bearing track of the guide rail, that the lubricating grease supply line terminates into the circulation space or into the bearing track of the guide rail at at least one lubricating grease outlet structure, and that a shutoff structure is provided in the lubricating grease supply line upstream of the lubricating greate outlet structure, said shut-off structure being openable by lubricating grease pressure.

The lubricant oil supply capillary line extends preferably over at least a substantial part of the length of the lubricating oil supply line between the lubricant supply space and the licking region. The licking region may extend over at least a substantial part of the length of the bearing or/and the returning rows of rolling members. The lubricant oil supply capillary line may be effective for preventing any flow of free lubricating oil or lubricating grease to the licking region due to a pressure difference. This, because the lubricant oil supply capillary line is principally impassable by lubricating grease, and furthermore because it is disposed within the lubricant oil supply line such that free flow of lubricating oil past the lubricant oil supply capillary line is not possible and that lubricating oil can only get to the licking region through the lubricant oil supply capillary line and will be throttled to such an extent that release of oil in the licking region is effected substantially without pressure simply by licking. On the other hand, it is suitable if the lubricating grease supply line is substantially unthrottled in its section downstream of the shut-off structure, so that unnecessary pressure loss can be avoided.

According to still another embodiment, the present invention relates to a linear guide device, comprising a guide rail having a longitudinal axis, at least one guide carriage guided on the guide rail in the direction of said longitudinal axis by means of at least one rolling member loop circulating in a circulation space of the guide carriage, said rolling member loop including a bearing row of rolling members in simultaneous engagement with a bearing track of the guide rail and a bearing track of the guide carriage, further a returning row of rolling members and two arcuate rows of rolling members, said guide carriage further comprising a carriage main body in a longitudinal region of the bearing row of rolling members and end units at axially both sides of the carriage main body, reversing guides for the arcuate rows of rolling members being further formed at least partly on the end units, a lubricant supply system being further provided in the guide carriage, said lubricant supply system extending to lubricant demand zones and being accommodated at least partly in a boundary region between at least one end unit and the carriage main body; this linear guide device may be designed especially according to one or both patterns described hereinbefore.

This embodiment of the invention provides the feature that a lubricant supply section of the lubricant supply system, which extends at least partly in the boundary region approximately in circumferential direction of the guide rail, is formed at least on a part of its length of a lubricating structure made of a lubricant retaining material, said lubricating structure having a lubricant releasing portion in wetting engagement with rolling members of said at least one rolling member loop or/and surface portions of the guide rail.

The lubricating structure may be made of an absorbent material conveying lubricant oil by capillary action; so, the wetting of the rolling members or of the guide rail is accomplished by licking of lubricant oil from the lubricating structure.

According to an alternative embodiment, the lubricating structure may be made of a material the composition of which has at least a lubricant portion. For example, the composition of the lubricating structure may comprise a base material to which a lubricant has been added. Furthermore, the lubricating structure may consist of a solid lubricant, such as graphite. With some of these materials, lubricant can be licked off almost without the application of mechanical pressure. With other materials, the action of heat and/or mechanical pressure may be required so that lubricant is released from the material structure of the lubricating structure and is supplied to the rolling members or the guide rail. The wetting contact is always such that, on relative movement between guide carriage and guide rail lubricant is supplied from the lubricating structure to the rolling members or the guide rail, be it in liquid or liquified or pasty form or in the form-of finest particles.

A further embodiment of the present invention according to this third embodiment provides the features that the guide carriage is substantially U-shaped and has a web portion adjacent a top surface of the guide rail and respective side a flange portion adjacent to each of the surfaces of the guide rail, that between each of said flange portions and the respective adjacent side surface there is disposed the bearing row of rolling members of at least one rolling member loop, and that the lubricating structure extends approximately over the length of each of said flange portions. In particular, the lubricating structure may be U-shaped and may extend also over at least a part of the web portion. Thus, the storing capacity of the lubricating structure can be increased to an extent to be possibly sufficient over the life of the linear guide device. The lubricating structure may be part of an intermediate plate unit which is arranged axially between an axial end of the carriage main body and the respective end unit. If the lubricating structure is made of a solid, inherently stable material, it would even be possible to dispose the lubricating structure unhoused between the end unit and the carriage main body. For sealing reasons and in order to provide protection against mechanical damage, the intermediate plate unit should suitably comprise a lubricant-tight case housing the lubricating body arrangement.

In case of sufficient inherent stability, it is even possible that a part of the reversing guide of an arcuate row of rolling members, particularly an inner arcuate reversing surface, is formed on the lubricating structure. Thus, a large-area lubricant region for the rolling members is obtained. Furthermore, the manufacture of the end units can be facilitated.

The lubricant demand zones may be provided close, but also outside of the roll surfaces of the linear guide device. For example, lubrication of the guide rail surface outside of its bearing track may be desired in order to keep a carriage sealing against the guide rail smooth. If a lubrication of the roll surfaces is wanted, this will be accomplished by the feature that the lubricating structure forms with its lubricant releasing portion at least a part of the bearing track of the guide carriage or/and of a return guide for the returning row of rolling members. In particular, one may provide that the return guide extends at least on a part of its length entirely within the lubricating structure.

If a wetting contact between the lubricating structure and the rolling members is wanted, one will have to take care that the rolling movement of the rolling members is not or at least not substantially affected. On the other hand, the wetting contact is to ensure sufficient lubricant supply to the rolling members. To fulfill these requirements, the guide carriage may comprise a press lip structure protruding into the circulaton space and preferably being elastic. This press lip structure presses the rolling members into contact with the lubricant releasing portion. Especially if the press lip structure is sufficiently flexible, the rolling members can pass through the circulation space nearly unobstructed. The press lip structure simultaneously ensures that the rolling members pass by the lubricating structure in a possibly large-area contact zone. It is in particular possible that the press lip structure is formed of the lubricating structure.

Principally, it is also possible that the lubricating structure comprises a lubricating member which is resiliently biassed into contact with the rolling members or/and the surface portions of the guide rail by means of a spring device. Thus, there can also be achieved safe contact between the lubricant demand zones and the lubricating structure.

BRIEF DESCRIPTION OF THE DRAWINGS

The present invention will be explained hereinafter in more detail by means of the attached drawings wherein.

DETAILED DESCRIPTION OF EXEMPLARY EMBODIMENTS

Figure 1:
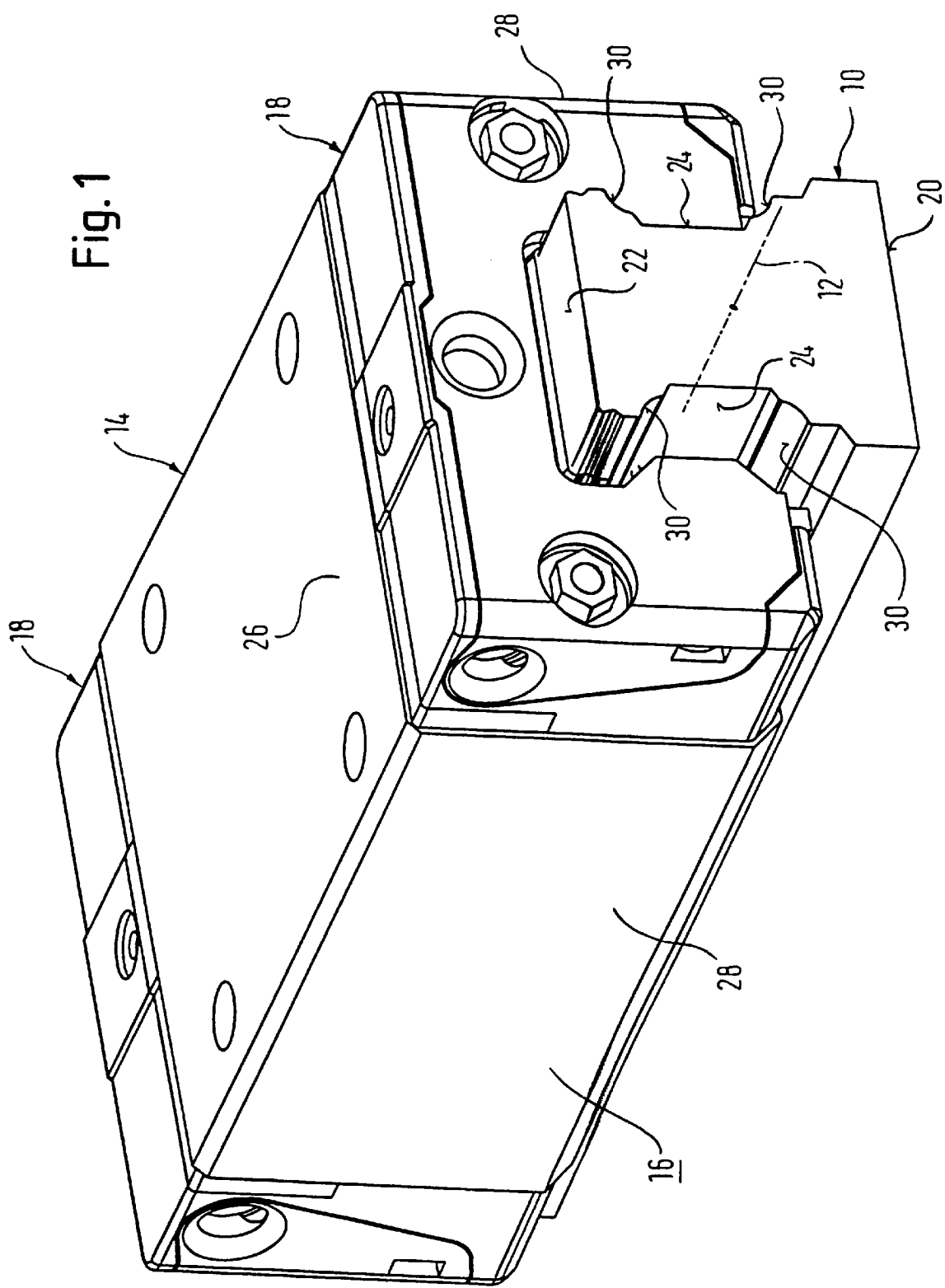
FIG. 1 is an overall perspective total view of an example embodiment of the linear guide device of the invention.

FIG. 1 shows a guide carriage 14 guided along a guide rail 10 in the direction of a rail axis 12, and comprising a carriage main body 16 and two end assemblies 18 on the axially opposite ends of the carriage main body 16. The guide rail 10 has a mounting face 20 for mounting the guide rail onto a carrier base "not shown," a top surface 22 opposite said mounting face 20 and two side surfaces 24. The guide carriage 14 embraces the guide rail 10 in a substantially U-shaped manner. The guide carriage 14 comprises a web portion 26 adjacent said top surface 22 and two flange portions 28 which are connected to each other by the web portion 26 and which are are adjacent to the respective side surfaces 24. Each of the flange portions 28 accommodates two endless-circulation rolling member loops (not shown in FIG. 1) whose bearing rolling member rows each roll along a bearing guide track 30 formed in the respective side surface 24. For the returning rolling member rows of the rolling member loops, an axially extending return bore (not shown) is provided in the carriage main body 16, whereas reversing guides for arcuate rows of rolling members of each of the rolling member loops are housed within the end assemblies 18. The tracks 30 of the guide rail 10 are designed in the example embodiment of FIG. 1 for ball races. It is understood that any other types of rolling members, such as rollers, barrels or pins, may be employed.

Figure 2:
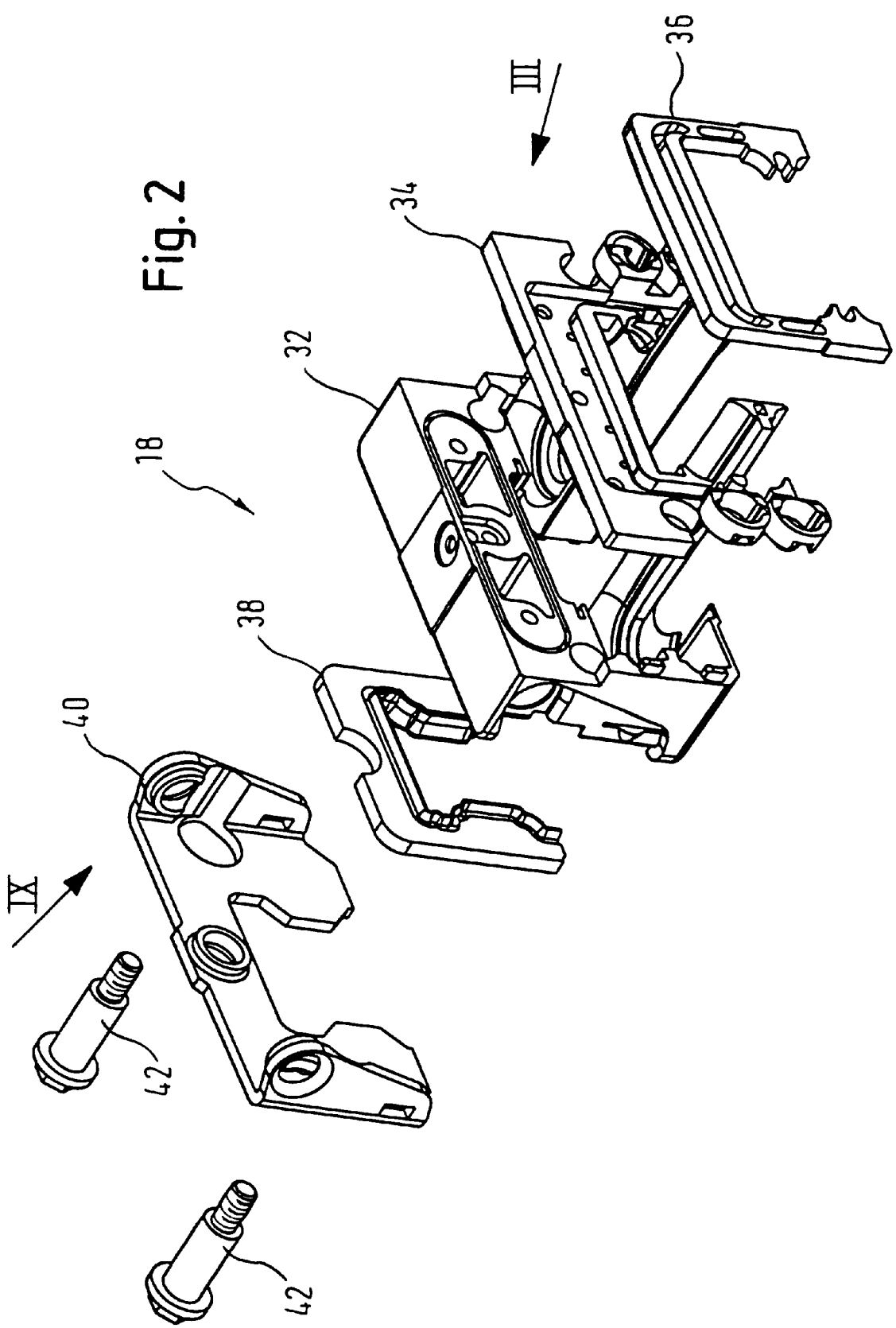
FIG. 2 is an exploded view of end assembly of an guide carriage of the linear guide device according to FIG. 1.

FIG. 2 shows that the end assemblies 18 each include of an end unit 32, an intermediate plate 34, a lubrication insert plate 36, a stripper sealing plate 38, an armouring plate 40 and fastening screws 42 for fastening the afore-mentioned component parts to the carriage main body 16 of the guide carriage 14. The intermediate plate 34 and the lubrication insert plate 36 are disposed between the end unit 32 and the carriage main body 16, whereas the stripper sealing plate 38 and the armouring plate 40 are mounted to the carriage main body 16 from the axially outer side of the end unit 32. The components of the end assemblies 18 are symmetrical with respect to a paraxial longitudinal median plane of the entire linear guide device.

Figure 3:
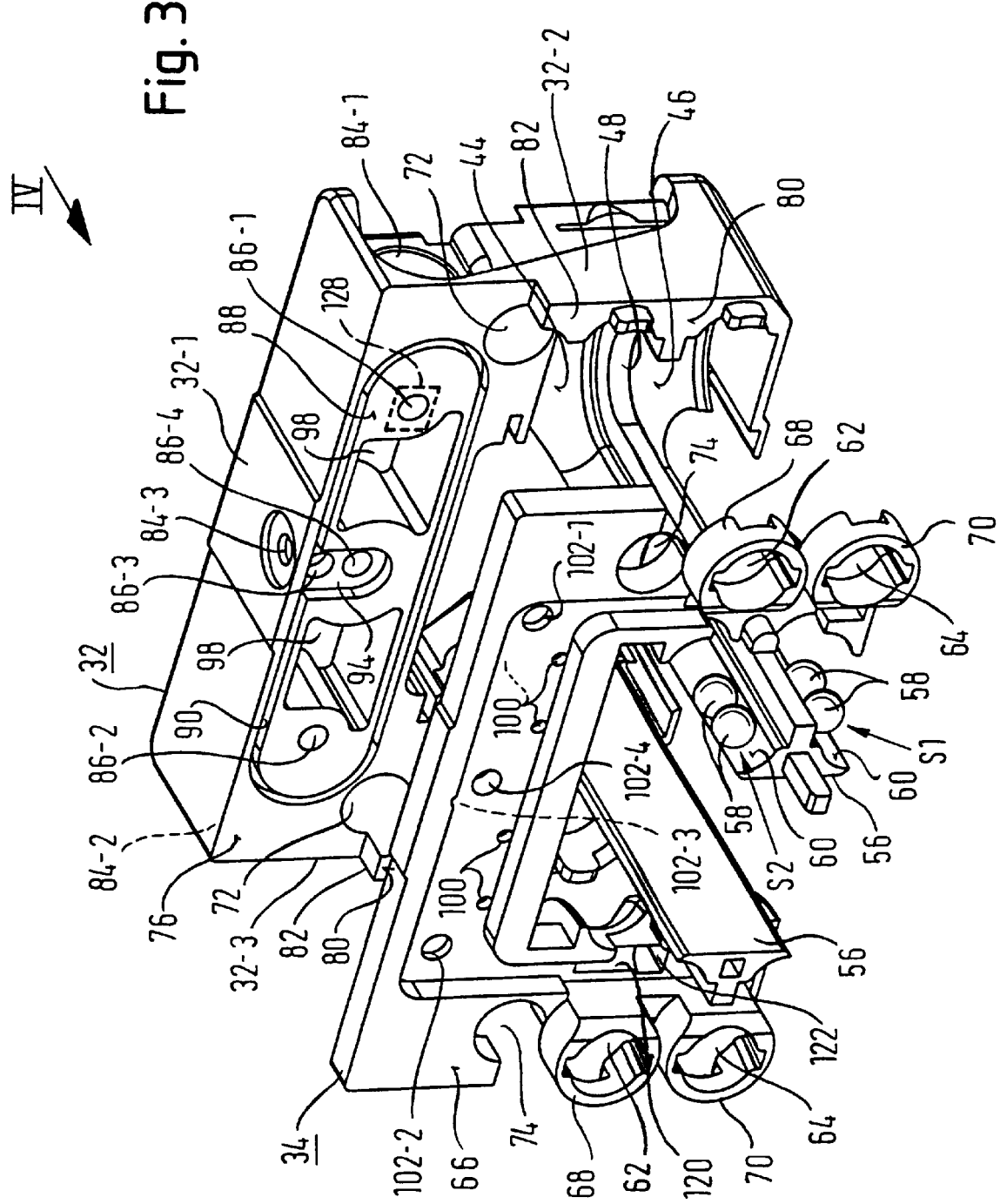
FIG. 3 shows an end unit and an intermediate plate of the end assembly of FIG. 2, when seen in the direction of arrow III in FIG. 2.
Figure 4:
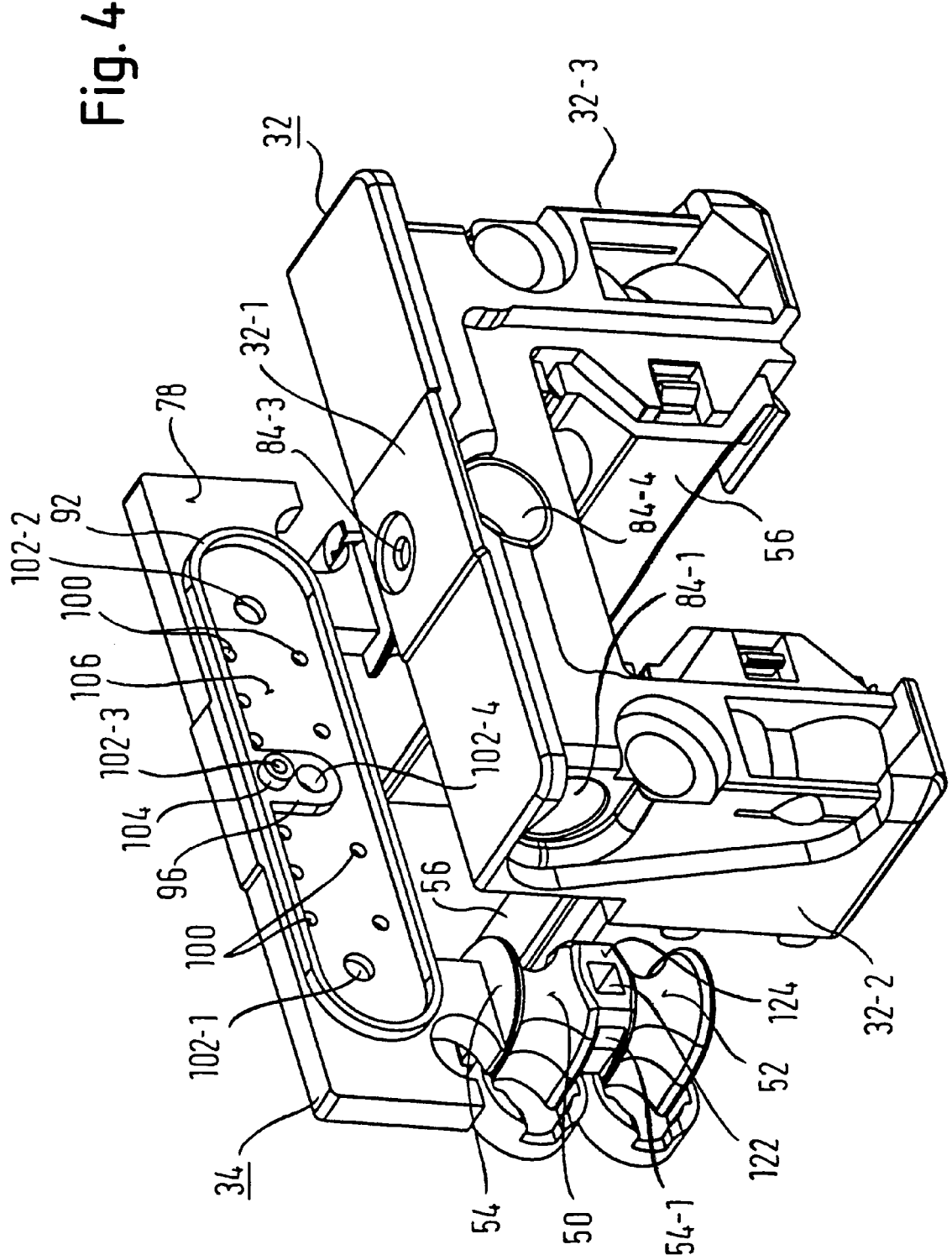
FIG. 4 shows the end unit and the intermediate plate of FIG. 3, when seen in the direction of arrow IV in FIG. 3.

Reference should now be had to FIGS. 3 and 4. The end unit 32 includes, in accordance with the U-shape of the guide carriage, an end unit web 32-1 and of end unit flanges 32-2, 32-3. In the end unit flanges 32-2, 32-3, outer arcuate, sub semi-toric reversing surfaces 44 and 46 are formed which are separated from each other by semi-cylindrical separating surfaces. The outer arcuate reversing surfaces 44, 46 form a part of the reversing guides in the end assemblies of the guide carriage. They are completed by inner arcuate reversing surfaces 50 and 52 which are formed on a reversing member 54 which is integral with the intermediate plate 34. In the assembled state, the inner arcuate reversing surface 52 is opposite the outer arcuate reversing surface 46, so that the pairs of reversing surfaces 50, 44 and 52, 46 each define a substantially semi-toric reversing channel for the balls of the respective ball loop.

In the direction of the axis of the linear guide device, a retaining strip 56 is attached to each of the end unit flanges 32-2, 32-3. This retaining strip 56 is to hold the balls of the two ball loops allocated to the respective flange portion 28 of the guide carriage 14 in engagement with bearing tracks of the carriage main body 16. FIG. 3 shows the balls 58 of two ball loops S1, S2 rolling along track surfaces 56 of the retaining strip 60. Within the area of the end unit 32, the track surfaces smoothly go over into the acruate outer reversing surfaces 44, 46.

The intermediate plate 34 has ball returning holes 62, 64 through which the returning balls of the respective ball loop have access to the return bores of the carriage main body 16. Sockets 68, 70, beginning at a contact surface 66 facing the carriage main body 16, are mounted to the intermediate plate 34. These sockets are integral with the intermediate plate 34 and are concentric with respect to the associated ball return hole 62, 64. When the end unit 32 and the intermediate plate 34 are mounted to the carriage main body 16, the sockets 68, 70 are inserted as positioning aids into enlarged end sections of the ball returning bores of the carriage main body 16.

Bolt receiving holes 72 and 74 being in alignment with each other are provided on the end unit 32 and on the intermediate plate 34 for the fastening of the fastening bols 42 shown in FIG. 2.

On its axial side facing the carriage main body 16, the end unit 32 has a contact surface 76 for abutment against a contact surface 78 of the intermediate plate 34. During assembly, the intermediate plate 34 abuts with its contact surface 66 against the respective axial front surface of the carriage main body 16. In the region of the end unit web 32-1, the intermediate plate 34 has substantially the same contour as the reversing members 54 and the sockets 68, 70 formed thereon, specifically by extrusion. In the assembled state of end unit 32 and intermediate plate 34, the contact surface 66 is laterally completed beside the sockets 68, 70 by a coplanar contact surface 80 which is formed on a step projection 82 of the respective, end unit flange 32-2, 32-3. The end unit 32 has lubricant supply connections 84-1, 84-2, 84-3 and 84-4. Each of these lubricant supply connections is connected with an associated opening on the side of the end unit 32 that is axially facing the intermediate plate 34, namely lubricant supply connection 84-1 with an opening 86-1, lubricant supply connection 84-2 with an opening 86-2, lubricant supply connection 84-3 with an opening 86-3 and lubricant supply connection 84-4 with an opening 86-4. The openings 86-1 and 86-2 terminate into a surface 88 which is on the same plane as contact surface 76 and is enclosed by a circular sealing groove 90. On its side that is axially facing the end unit 32, the intermediate plate 34 comprises a sealing web 92 which engages the groove 90 of the end unit 32 lubricant-tightly as the end assembly is mounted. The openings 86-3 and 86-4 terminate into a recess 94 recessed with respect to the surface 88. Opposite to this recess, 94 an equally contoured projection 96 is provided on the intermediate plate 34. On both sides of the pair of openings 86-3, 86-4, a lubricant storing chamber 98 each is formed in the end unit web 32-1. A plurality of passage holes 100 of smaller cross-section are provided opposite the storing chambers 98 on the intermediate plate. Furthermore, the intermediate plate 34 has passage holes 102-1, 102-2 and 102-4 of larger cross-section which are opposite of the openings 86-1, 86-2 and 86-4. Finally, a further passage hole 102-3 is defined by an annular lug formed on the projection 96. This passage hole 102-3 is opposite to the opening 86-3 of the end unit 32.

The lubricant supply connections 84-3 and 84-4 may also be connected with a single common opening, possibly with opening 86-4. In association with this single opening, the intermediate plate 34 will then also have only one passage hole, possibly passage hole 102-4.

On the side axially facing the end unit 32, the passage holes 100 of smaller cross-section and the passage holes 102-1 and 102-2 of larger cross-section are disposed in a surface 106 which is on the same plane as contact surface 78 and is separated from the latter by the sealing web 92. The passage hole 102-4 of larger cross-section terminates into the projection 96. When the end assembly is mounted, the surface 88 of the end unit 32 and the surface 106 of the intermediate plate 34 are closely contacting each other so that within this area there is no space between the end unit 32 and the intermediate plate 34. The openings 86-1, 86-2 and 86-4 of the end unit 32 then go directly over into the associated passage hole 102-1, 102-2, 102-4 of the intermediate plate 34. Accordingly, the passage hole 102-3 is then in direct communication with the opening 86-3, as the annular lug 104 engages the opening 86-3.

The lubricant supply bores 84-1 to 84-4, the consecutive end unit channels extending up to the openings 86-1 to 86-4, the passage holes 102-1 to 102-4, the storing chambers 98 and the passage holes 100 being in communication with these storing chambers define a lubricant supply space from where the ball loops S1 and S2 may selectively be provided with high-viscosity lubricating grease or with low-viscosity, light lubricating oil. The lubricant, be it lubricating grease or lubricating oil, is selectively introduced into the lubricant supply space through one of the lubricant supply connections 84-1 to 84-4. A lubricating oil supply line and a lubricating grease supply line start out in parallelism from this lubricant supply space and convey lubricating oil or lubricating grease to the ball loops S1, S2. For a description of the lubricating oil supply line, reference is now made to FIGS. 5 and 6.

A relief-type recess 108 substantially extending about the guide rail in U-form is embedded in the intermediate plate contact surface 66 facing the carriage main body. The recess 108 is open towards the carriage main body. This relief-type recess 108 is formed when die-casting the intermediate plate 34, which consists preferably of a hard plastics material. Into this relief-type recess 108, a suction member 110 (FIG. 6) forming the lubricant insert plate 36 is inserted, if desired under slight bias. The suction member consists of a lubricant-absorbent material exhibiting conveying characteristics on account of capillary activity. This material may be a textile material, such as felt. Preferably, the material of the suction member 110 is an open-cell foam material, in particular a polymer plastics material, in the pore system of which lubricating oil is evenly distributed over the entire suction member 110 without externally applied pressure, i.e., only by capillary activity. The U-shaped suction meber 110 serves for the simultaneous lubricating oil supply to all ball loops of the guide carriage and extends therefore over the web portion of the intermediate plate 34 and into both flange portions. At the ball loops S1 and S2, the recess 108 is connected through openings 112 (FIG. 5) with the circulation space of the ball loops S1, S2, especially with the space provided for the bearing ball rows of ball loops S1, S2. The suction member 110 extends into these openings 112 and extends with rounded contact surfaces 114 flushingly over into the track system provided within the guide carriage for the ball loops S1, S2. When circulating through the circulation space, the balls of the ball loops S1, S2 pass by the contact surfaces 114 and are wetted with lubricating oil which they lick from the contact surfaces 114. The wetting contact of the suction member 110 with the balls of the ball loops S1, S2 takes place in the example embodiment in the transition zone between the bearing ball rows of the ball loops S1, S2 and the consecutive arcuate ball rows. It is understood that the suction member 110 may extend into the circulation space also at other points of the circulation path of the balls of the ball loops S1, S2, e.g., possibly at the transition point between the returning ball rows of the ball loops S1, S2 and the consecutive arcuate ball rows.

Figure 6:
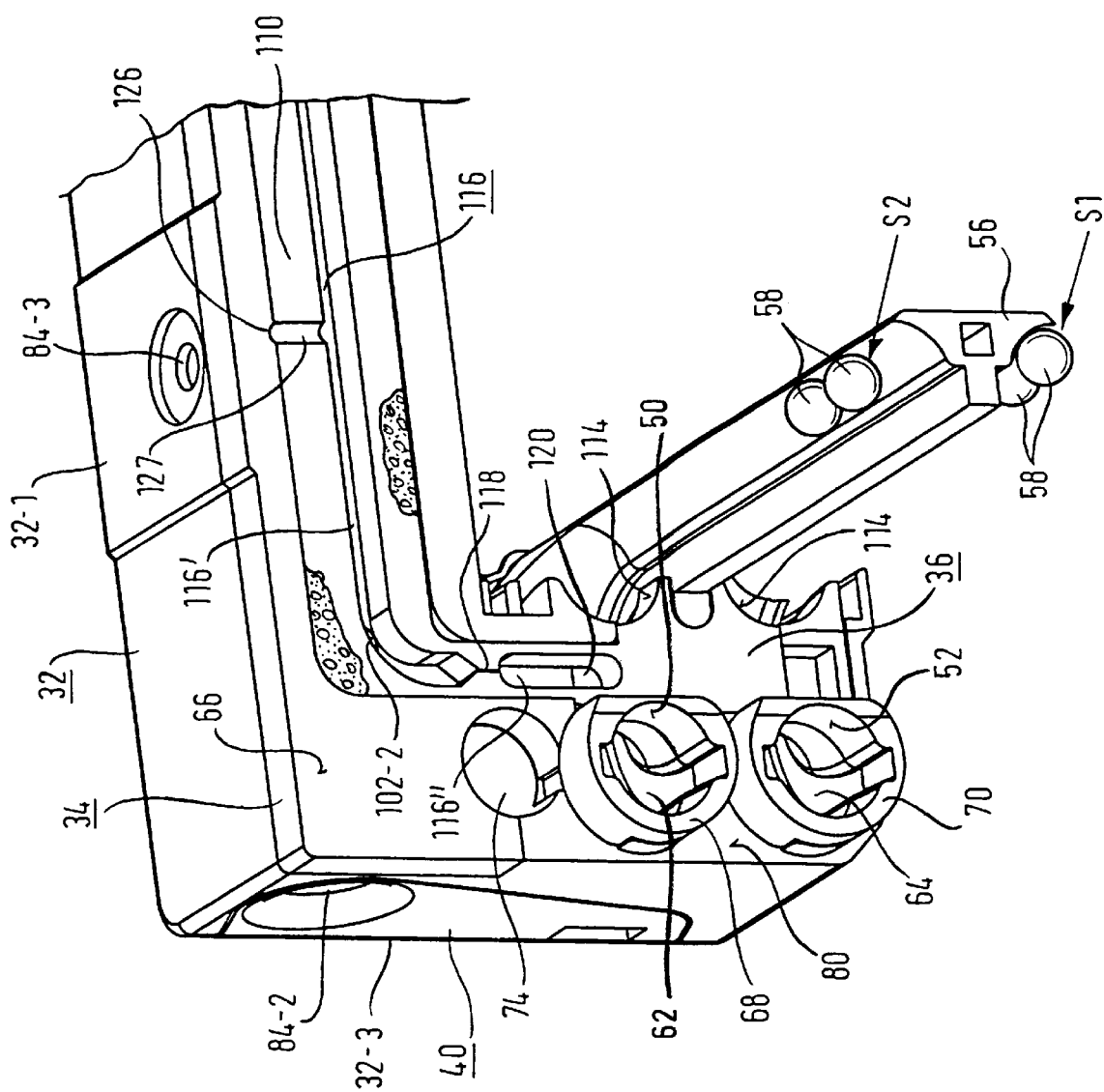
FIG. 6 shows the left-side half of the end assembly of FIG. 5, with the inserted lubrication insert plate.

The said lubricating grease supply line is formed in such manner that a slit 116 (FIG. 6) is provided within the suction member 110. This slit 116 passes through the suction member 110 in the direction of the axis and extends over the web portion of the suction member 110 into both flange portions of the suction member 110. The slit is positioned within the suction member 110 in such a manner that the passage holes 102-1, 102-2 and 102-4 of large cross-section are within the reach of the slit 116 and are not covered by the suction member 110. FIG. 6 shows a section of the passage bore 102-2. The passage bores 100 of smaller cross-section are completely covered by the suction member 110.

At 118, the slit 116 is narrowed such that a relief pressure valve is formed which closes, in the pressureless state, the passage between a slit portion 116' upstream of the relief pressure valve 118 and a slit portion 116" downstream of the relief pressure valve 118 and which opens this passage when a pressure drop is applied between the upstream and the down-stream slit portions. The material of the suction member 110 is elastically compressible. It is understood that the relief pressure valve 118 may not only be formed of a slit constriction defined by the material of the suction member 110 but also by a valve lamella formed in one piece on the intermediate plate and projecting into the slit 116.

In the following description will be considered the case that high-viscosity lubricating grease is pressed in through one of the lubricant supply connections 84-1 to 84-4 by means of a grease press. If the lubricant supply connection 84-1 is selected, the lubricating grease arrives (only) at the opening 86-1 and enters through passage hole 102-1 into the slit 116 within the suction member 110. Now, the lubricating grease arrives at the relief pressure valves 118 and is present under the full pressure generated by the grease press. If this pressurized lubricating grease is present at the relief pressure valve 118, the valve opens and the lubricating grease can flow into the slit region 116" downstream of the relief pressure valve 118.

Figure 5:
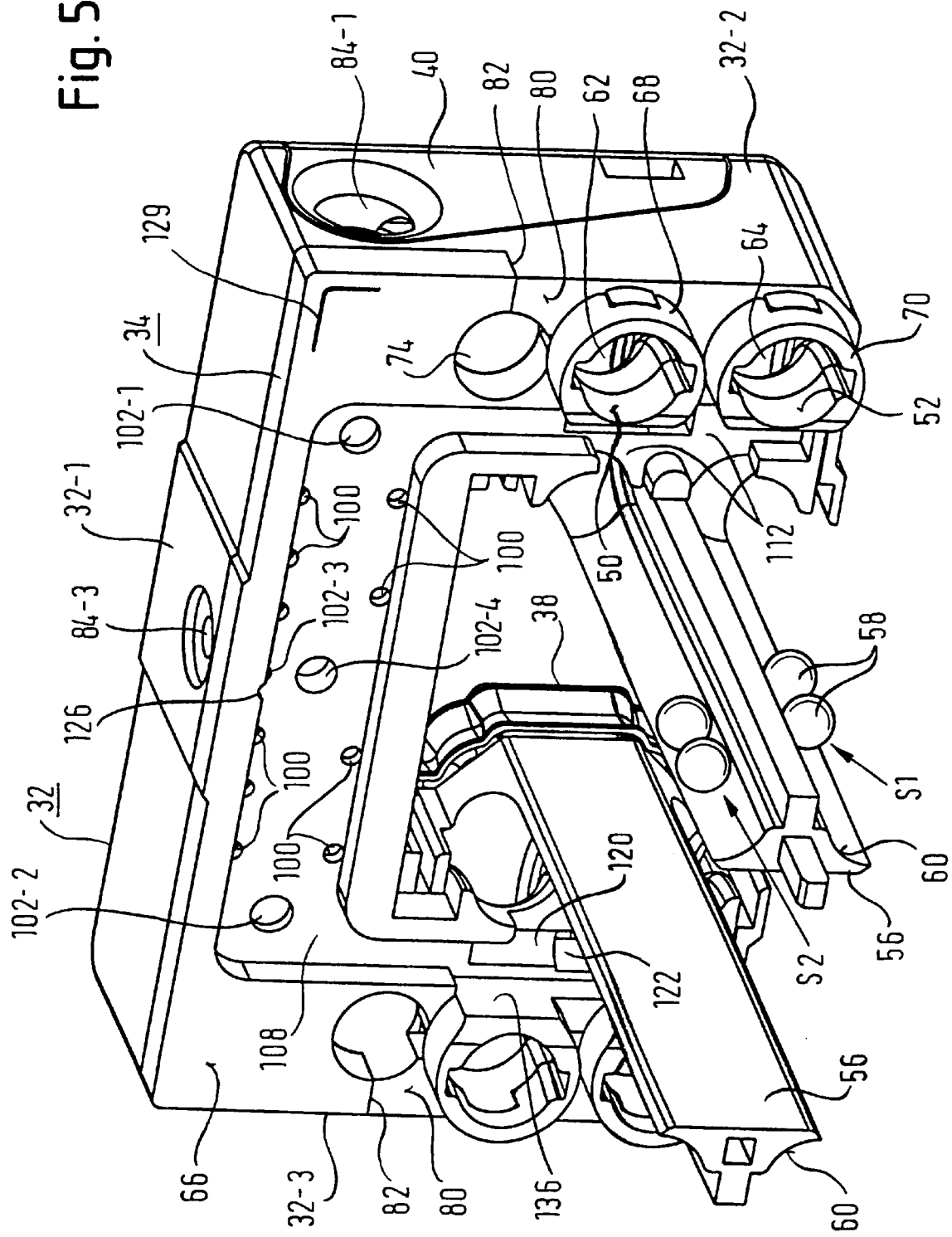
FIG. 5 shows the end assembly of FIG. 2 in an assembled state in a view similar to that of FIG. 3, but without a lubrication insert plate to be inserted into the intermediate plate.

At the end of the slit portion 116", the lubricating grease invades into a channel 120 within the relief-type recess 108 (see in particular FIGS. 3 and 5). The lubricating grease within this channel is transported to a cutoff channel 122 (see FIGS. 3 and 4) passing through the reversing member 54 from the end unit-remote side to the end unit-close side. The lubricating grease cannot penetrate the suction member 110, as the material of the suction member 11 enetrable to lubricating grease. Between the intermediate plate 34 and the carriage main body, 16 the lubricating grease cannot escape either, as the intermediate plate 34 closely abuts against the carriage main body. Therefore, the only path left for lubricating grease is the channel 120 within the cutout channel 122 covered by the suction member 110. This cutout channel is directed towards the semi-cylindrical surface 48 between the two outer arcuate reversing surfaces 44, 46 and terminates into a flattened portion 124 between the inner arcuate reversing surfaces 50, 52 of the reversing member 54 (FIG. 4). This flattened portion 124 defines with the opposite semi-cylindrical surface 48 two grease outlet openings, one thereof leading to the lower ball loop S1 and the other leading to the upper ball loop S2. Due to the fact that the middle portion 54-1 of the reversing member 54 (FIG. 4) abuts substantially closely against the semi-cylindrical surface 48 of the end unit 32 and leaves only within the area of its flattening 124 an intermediate space towards the semicylindrical surface 48, lubricating grease can only flow off upwardly and downwardly to the ball loops S1, S2. Downstream of the valve-type slit constriction 118, there is practically no further throttling of the lubricating grease. The lubricating grease flows without substantial obstruction through the slit portion 116" downstream of valve 118, the channel 120, the cutout channel 122 and the outlet openings at the flattening 124 to the ball loops S1, S2. But it need not be feared that lubricant present in the channel 120, in the cutout channel 122 and at the outlet openings will flow to the ball loops S1, S2, as only high-viscosity lubricant grease gets into the channel 120 and no low-viscosity lubricating oil, in case that lubricating oil is being used. Although the lower ball loop S1 is positioned deeper than the upper ball loop S2 (if one considers in the drawings the orientation of the guide carriage as the operating position) and although the comparably large-dimensioned outlet openings at the flattening 124 are superposed in vertical alignment, there will be no considerable danger that lubricating grease will flow from the upper ball loop S2 to the lower ball loop S1, thus causing a grease impoverishment in the upper ball loop S2. This is due to the high viscosity of the lubricating grease which precludes gravity-related distribution of lubricating grease.

Analogous proceedings occur if lubricating grease is pressed in through the lubricant supply connections 84-2 and 84-4. If grease is supplied through the lubricating supply connection 84-3, the situation is a bit different, as the passage hole 102-3 associated with the lubricant supply connection 84-3 is covered by the suction member 110. Access of grease to the slit portion 116' is then possible, for example, through a groove 126 at the upper edge of recess 108 and through a suction member recess 127 following the groove 126 and extending to the slit portion 116'. Instead of providing such a recess 127 on the suction member side facing the carriage main body 16, one may want to provide it also on the suction member side facing the bottom of the recess 108. Such a recess 127 may also be provided in the bottom of the recess 108 itself. In the two latter-mentioned cases, the groove 126 can be eliminated.

In the following description will be considered the case of lubrication with lubricating oil. If lubricating oil is supplied through one of connections 84-1 to 84-4, possibly through a central lubricant supply system of the machine comprising the linear guide device, which lubricant supply system resupplies lubricating oil in periodic intervals, the lubricating oil gets again through the openings 86-1 to 86-4 and the passage holes 102-1 to 102-4 into the relief-type recess 108, where it is absorbed by the suction member 110. Lubricating oil flowing in through the passage hole 102-3 is immediately absorbed by the suction member 110 as the suction member covers this passage hole, whereas lubricating oil flowing in through the passage holes 102-1, 102-2 and 102-4 first gets into the slit 116, is distributed therein and is gradually absorbed by the suction member 110. Within the suction member 110, the lubricating oil is then conveyed to the rounded contact surfaces 114. Lubrication of the ball loops S1, S2 with lubricating oil is effected in such a manner that the suction member 110 is permanently saturated with lubricating oil and the balls lick lubricating oil from the contact surfaces 114. Thus, continuous and sufficient lubrication of all balls is guaranteed without the danger that free lubricating oil is stored in larger quantities in the circulation space of the ball loops S1, S2.

For the filling of lubricating oil into the guide carriage, it would be sufficient to let lubricating oil flow in substantially pressureless through one of the lubricant supply connections 84-1 to 84-4 in such amounts that the suction member 110 is completely wetted and, if desired, also the slit portion 116' upstream of the valves 118 is filled with lubricating oil. This free lubricating oil is then present at the oil-tightly blocking relief pressure valves 118, but cannot open them. Consequently, no free lubricating oil can flow out through the channel 120 and the cutout channel 122 to the ball loops SI, S2. In order to fill also the storing chambers 98 with lubricating oil, one will have to fill the lubricating oil into the guide carriage under a certain pressure, so that after saturation of the suction member 110, lubricating oil is "exudated" by the suction member 110 and can get through the passage holes 100 of smaller cross-section into the storing chambers 98. Then, it may occur that the relief pressure valves 118 open for a short period of time, thus possibly causing free lubricating oil to flows through the channel 120 and the cutout channel 122 to the outlet openings at the flattening 124. One will however try to adjust the opening pressure of the relief pressure valves 118 such that, at usual oil filling pressures, the relief pressure valves 118 do not open. Then, there is still left the possibility that on account of the oil filling pressure lubricating oil is exudated on the contact surfaces 114. However, in the suction member 110 there will be such a great pressure drop along the relatively long path to the contact surfaces 114 that such exudation of lubricating oil on the contact surfaces 114 takes place at best to a tolerable extent. Even in case of lubricating oil redosage, no larger quantities of lubricating oil get into the circulation space of the ball loops S1, S2.

If undesired lubricating oil flows through the relief pressure valve 118, the channel 120 and the cutout channel 122 into the circulation space for the ball loops S1, S2, it will flow to the lowernext ball loop due to gravity. Detrimental impoverishment of lubricating oil in the upper-next ball loop need not be feared, as by the permanent licking off of lubricating oil on the contact surfaces 114 permanent and sufficient lubrication of the uppernext ball loop is guaranteed, even if within this uppernext ball loop—corresponding to the normal operational state—no free lubricating oil is present.

The free lubricating oil within the storing chambers 98 and the slit 116 allows continuous feed to the suction member 110, so that the suction member does not dry out. Due to its sucking action, the suction member 110 sucks lubricating oil from the storing chambers 98 and the slit 116 in such amounts that a complete wetting of the suction member is maintained. It is of advantage that, in case of grease lubrication, the storing chambers 98 are not filled with lubricating grease, as the passage holes 100 of smaller cross-section allowing access to the storing chambers 98 are closed by the suction member. An accumulation of greater quantities of "dead", unused lubricating grease within the guide carriage is then avoided. This has takes a favourable influence on the total grease quantity to be filled into the guide carriage.

When filling the storing chambers 98, one may also want to arrange the passage holes 100 in the intermediate plate 34 in axial alignment with the slit portion 116', so that lubricating oil entering through the passage holes 102-1, 102-2 and 102-4 directly flows into the storing chambers 98. This is an alternative to the aforementioned possibility of filling the storing chambers 98 by exudation of lubricating oil from the suction member 110.

However, with this alternative, one will have to put up with the fact that in case of grease lubrication, lubricating, grease might also get into the storing chambers 98. By smaller dimensioning of the passage holes 100, the flow of grease through the passage holes 100 into the storing chambers 98 can be kept low. During operation however the linear guide device might become heated with the consequence that there may be an undesired flow of grease into the storing chambers 98.

The sealing between the contact surface 76 of the end unit 32 and the contact surface 78 of the intermediate plate 34 and the sealing between the contact surface 66 of the intermediate plate 34 and the opposite front surface of the carriage main body 16 is accomplished by suitable selection of material and/or suitable arrangement of sealing elements on the intermediate plate 34 and/or on the end unit 32. Such a sealing element is the sealing web 92 on the intermediate plate 34, which sealing web engages the groove 90 of the end unit 32. Furthermore, sealing lips may be provided on the intermediate plate 34, as shown in FIG. 5 by reference numeral 129. The suction member 110 has no sealing effect against lubricating oil, and cannot take over such effect, as it is completely saturated with lubricating oil even if during its installation the suction member has been biassed in order to cause it to completely fill the relief-type recess 108.

Figure 7:
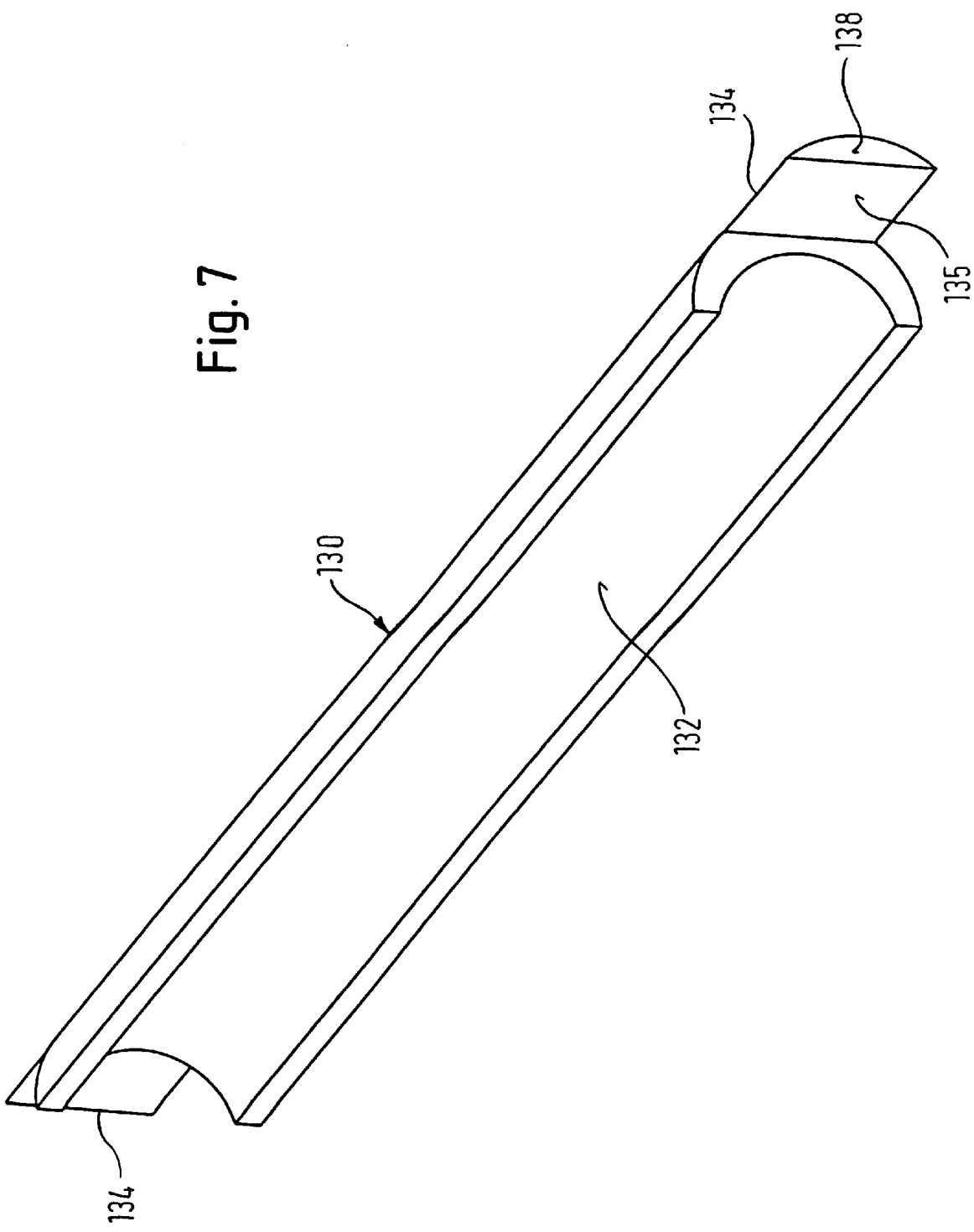
FIG. 7 is a perspective view of a lubrication half shell to be inserted into a return bore of the guide carriage.

At least the lubricant supply connections 84-1, 84-2 and 84-4 are in communication with each other via the slit 116 and the passage holes 102-1, 102-2 and 102-4. If lubricant is to be filled in at one of the lubricant supply connections, it is therefore necessary to close the connections not in use with a blind plug. The connection actually in use is provided with a lubricating nipple. In order to avoid such blind plugs, it is possible to allocate a valve member acting as check valve each of to the individual or groups of connections 84-1 to 84-4 (e.g. group of connections 84-3, 84-4). By this check valve, the respective connection or the respective group of connections is separated from the other connections. These valve members may, for example be formed as valve flaps which are provided on the end unit 32 or on the intermediate plate 34, preferably formed thereon, and which close the openings 86-1 to 86-4 or the passage holes 102-1 to 102-4. FIG. 3 shows by a dashed line a valve flap 128 closing the opening 86-1. When a lubricant pressure is applied to the connection 84-1, this valve flap deflects and liberates the opening 86-1. It is understood that in this case between the surface 88 of the end unit 32 and the opposite surface 106 of the intermediate plate 34 a space must be left which allows deflection of the valve flap 129. When lubricant supply takes place at the connection 84-1, blind plugs need not be provided for the other connections 84-2 to 84-4, as the valve flaps (not shown in FIG. 3) allocated thereto keep the openings 86-2 to 86-4 closed and prevent backflow of lubricant to the connections 84-2 to 84-4. FIG. 7 shows a lubricant half shell 130 which is inserted into the ball return channels of the carriage main body 16 and forms an extension of the lubricant oil supply capillary line formed by the suction member 110 into the range of the returning ball rows of the ball loops S1, S2. By its concave inner side 132, the lubricant half shell 130 forms a track surface for the returning balls of the respective ball loop S1, S2. The lubricant half shell 130 consists of a lubricant-absorbing material which has conveying characteristics on the basis of capillary activity. Again, an open-cell foam material is employed. However, due to its high resistance to wear, sinter metal, particularly sinter bronze, is the preferred material. At its opposing longitudinal ends, the lubricant half shell 130 comprises a projecting circular-segment tongue 134 which joins with a positioning surface 135 a flattening 136 (FIG. 5) of one of the positioning rings 68, 70. By a terminal abutment surface 138, the lubricant half shell abuts against the suction member 110 inserted into the intermediate plate 34, so that the lubricant half shell 130 can suck lubricant out of the suction member 110.

It has been shown that already this small-surface contact of the circular-segment abutment surface 138 of the lubricant half shell with the suction member 110 is sufficient to achieve after a comparably short period of time a complete saturation of the lubricant half shell 130 with lubricating oil.

Figure 8:
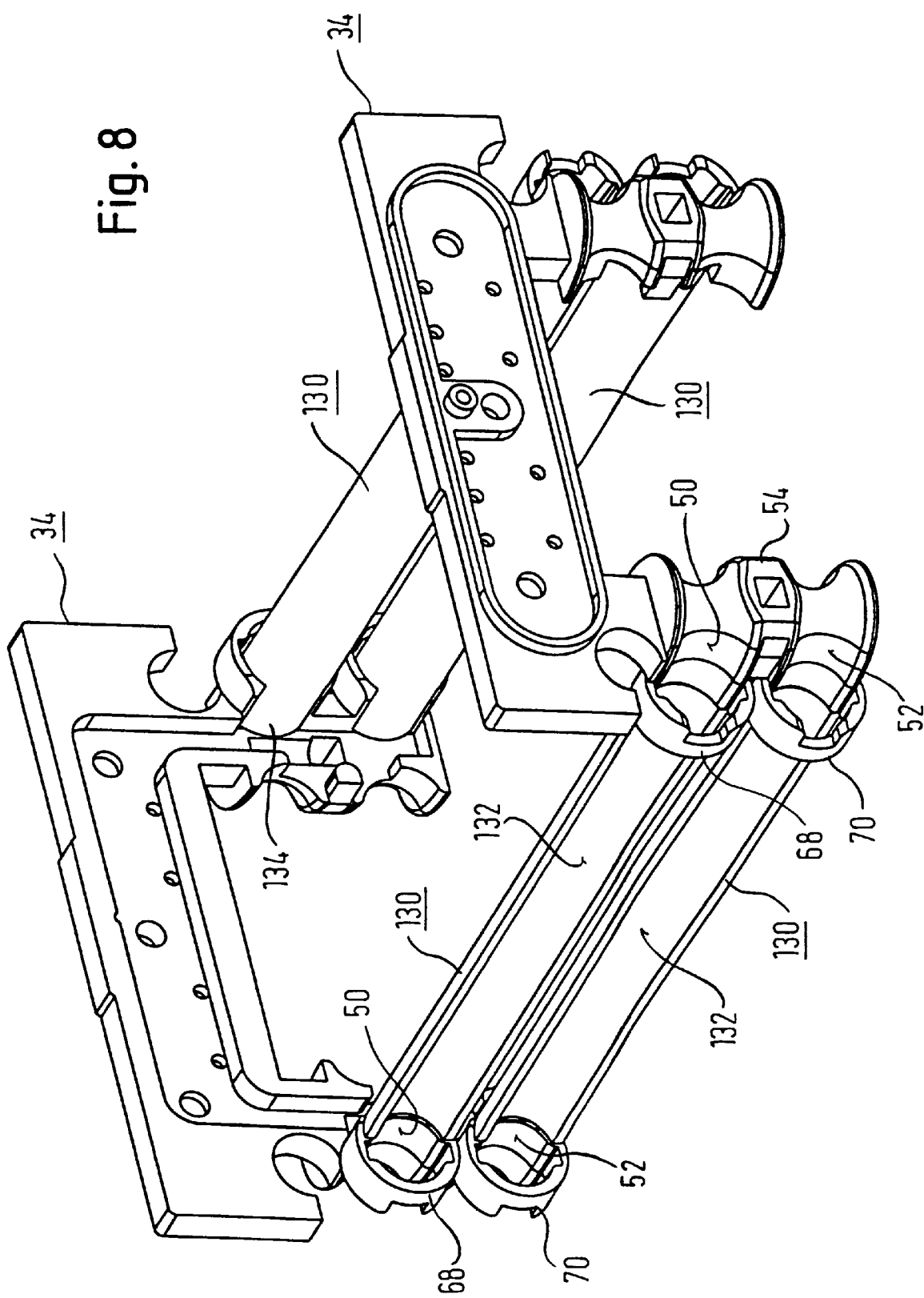
FIG. 8 is a perspective view of the intermediate plates of two end assemblies of the guide carriage with lubrication half shells therebetween.

FIG. 8 shows that by their ball track surfaces 132, the lubricant half shells 130 abutting against the positioning rings 68, 70 form a smooth continuous transition to the respective inner arcuate reversing surfaces 50, 52.

Figure 9:
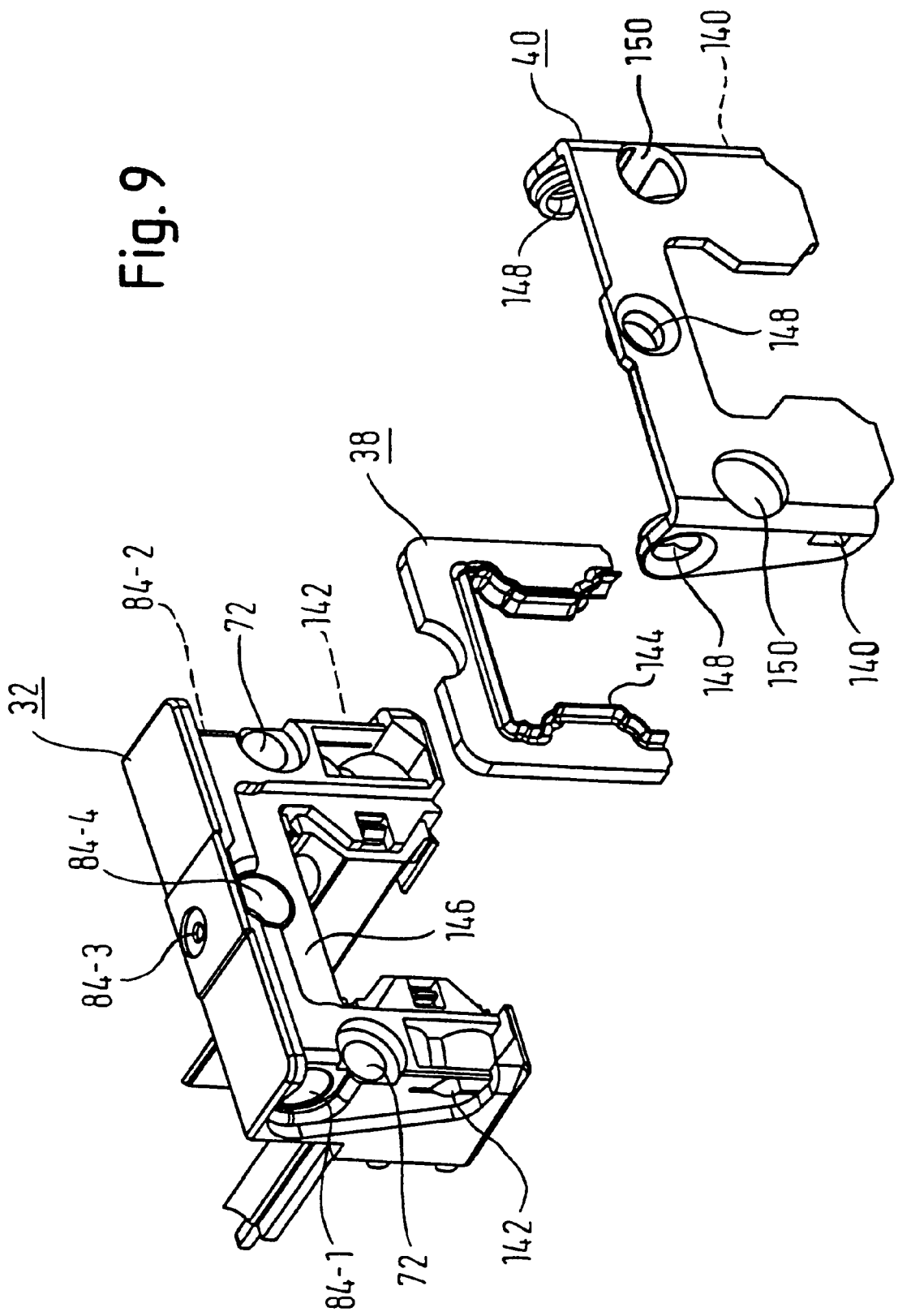
FIG. 9 is an explosed view of the end unit, of a stripper sealing plate and an armouring plate of the end assembly, when seen in the direction of arrow IX in FIG. 2.

FIG. 9 shows that with arresting recesses 140 the armouring plate 40 preferably made of sheet metal, snaps into arresting projections 142 of the end unit 32. The sealing plate 38, being adapted in contour to the configuration of the guide rail and abutting with a double sealing lip arrangement 144 against the guide rail is received between the end unit 32 and the armouring plate 40 in a recess 146 on the side of the end unit 32 that is remote from the carriage main body. Internal screw sockets 148 are integral with the armouring plate 40 and are aligned alignment with the end unit connection bores forming the lubricant supply connections 84-1, 84-2 and 84-4 when the armouring plate 40 is mounted to the end unit 32. A lubricating nipple can be screwed into one or more of the internal screw sockets 148 for connection of a lubricant filling device. One may also employ blind plugs in order to close lubricant supply connections not in use. Damage to the armouring plate 40 caused by the screwing in place of a lubricating nipple need not be feared in view of the metal material of the armouring plate 40, as compared with the usually extruded end unit 32 of plastic material where too strong screwing in place of a lubricating nippie might easily cause damage to the plastic material.

In the present example embodiment, no internal screw socket on the armouring plate 40 is associated with the lubricant supply connection 84-3. It is however understood that the armouring plate 40 may also extend over the lubricant supply connection 84-3. Holes 150 in the armouring plate 40 allow the passage of fastening screws 42 shown in FIG. 2.

In the following, there will be described once more the proceedings during the filling of the guide carriage with lubricant. It is assumed that the guide carriage is in the assembied and ready-for-operation state and may already stand on the guide rail. First will be described the case of an intended oil lubrication: An oil filling line is connected to one of the lubricant supply connections 84-1 to 84-4. This may be accomplished in such a manner that a lubricating nipple comprising a check valve is screwed into the respective supply connection and the oil filling line is connected to this lubricating nipple. The oil filling line may also have a screw thread for screwing the oil filling line into the respective supply connection. The oil filling line is connected to an oil supply unit which is able to deliver a desired lubricating oil volume required for the oil filling of the guide carriage. The oil supply unit can deliver this lubricating oil volume according to a predetermined supply program, e.g. such that a constant stream of oil under constant oil pressure is released over a predetermined period of time, but also such that the oil stream or/and the oil pressure follow a varying time schedule. The supply program of the oil supply unit may, if desired, be varied and set by the operator.

From the respective supply connection 84-1 to 84-4, oil flows through the associated opening 86-1 to 86-4 and the associated passage hole 102-1 to 102-4 into the recess 108 in the intermediate plate 34. If the lubricating oil has been filled in at one of the supply connections 84-1, 84-2 and 84-4, it enters through the slit portion 116' within the suction member 110, is distributed therein and is gradually absorbed by the suction member 110. Lubricating oil being filled in at the supply connection 84-3 and having passed through the passage hole 102-3 arrives directly at the suction member 110. If the oil throughflow at the supply connection 84-3 exceeds the absorptive capacity of the suction member 110, it may happen that lubricating oil flowing out of the passage hole 102-3 and not having been immediately absorbed by the suction member 110 may press the material of the suction member 110 aside and clear a path past the suction member 110 into the slit portion 116'.

If, after the first filling of the guide carriage, the suction member 110 is still completely dry or after a predetermined time of operation of the linear guide device or a predetermined terminated run of the guide carriage, the oil supply in the guide carriage has run low and the suction member is no longer saturated by lubricating oil, the suction member 110 absorbs the lubricating oil having flowed into the slit portion 116' or flowing in through the passage hole 102-3 within its web portion, so that an oil accumulation takes place. This oil accumulation causes within the suction member 110 a saturation gradient between the suction member web portion and the licking portions including the contact surfaces 114. Due to this saturation gradient, the oil absorbed in the web portion is fed by capillary action into the flange portions of the suction member 110 and to the licking portions. This takes place independendently of the pressure at which the lubricating oil is present in the slit portion 116', and will also take place if the lubricating oil within the slit portion 116' is pressureless.

Unbound lubricating oil may be distributed within the slit portion 116' up to the check valves 118. If the check valves 118 were opened by oil pressure, free oil would flow through the downstream slit portions 116", the channels 120 and the cutout channels 122 to the grease outlet openings at the flattenings 124. In order to prevent this, the oil filling is carried out in such a manner that at no time is an oil pressure exceeding the opening pressure of the valves 118 generated within the upstream slit portion 116'. This requires a suitable mutual adjustment of various parameters, such as absorptive capacity of the material of the suction member 110, the size of the suction member surface being in contact with unbound oil, the oil filling pressure applied by the oil supply unit, and the throughflow rate of the oil filled in, i.e. the oil volume filled in per time unit. It may be the case that the oil supply unit releases lubricating oil at a constant throughflow rate and at a constant oil filling pressure and that the suction member 110 quickly absorbs the lubricating oil having arrived, so that no oil pressure causing the opening of the check valves 118 is generated within the slit portion 116'. However, it is also possible that the oil supply unit first keeps the oil filling pressure or/and the throughflow rate of the lubricating oil at a relatively high level as long as the slit portion 116' is still empty or only slightly filled. If the slit portion 116' then gets gradually filled with lubricating oil, as the absorptive capacity and the conveying capacity of the suction member 110 are not sufficient in a position to transport the lubricating oil arriving at the suction member 110 sufficiently rapidly into the flange portions to the contact surfaces 114, the oil supply unit reduces the oil filling pressure or/and the throughflow rate of the lubricating oil such that again no oil pressure exceeding the opening pressure of the check valves 118 can develop in the slit portion 116'. In particular towards the end of the filling step, i.e. when the major part of the oil volume intended for the filling of the guide carriage has already been filled in, the supply program of the oil supply unit may be such that the residual oil quantities are filled in only at a very low filling pressure and very slowly. Because it is to be assumed that, at such time the suction member 110 is completely saturated with lubricating oil and only small empty spaces remain in the slit portion 116' and in the storing chambers 98 for receiving residual quantities of lubricating oil.

If, nevertheless, during the oil filling step nevertheless undesired oil pressure causing the check valves 118 to open for a short time is generated for a short period of time within the upstream slit portion 116', parts of the unbound lubricating oil may get from the upstream slit portion 116' into the downstream slit portion 116". This lubricating oil may however also be absorbed downstream of the check valves 118 by the suction member 110, as the boundary walls of the downstream slit portion 116" reserved for transport of grease only are partly formed by the suction surface of the suction member 110. Consequently, also downstream of the check valves 118 there is communication between the grease transporting path and the oil transporting path, this communication serving to divert lubricating oil passing through the check valves 118 to the oil transporting path and to prevent this lubricating oil from flowing out at the grease releasing points.

In the following will be described the case of an intended grease lubrication. A grease press is connected to one of the supply connections 84-1 to 84-4; again, a lubricating nipple can be screwed into the respective supply connection or a grease fill-in line can directly be screwed into the respective supply connection by means of a screw thread. Grease gets into the recess 108 on the same path as the lubricating oil, as described hereinbefore. However, as the suction member 110 forms a grease-impermeable barrier and as no grease can escape between the intermediate plate 34 and the carriage main body 16, the upstream slit portion 116' gets gradually filled until, within the slit portion 116', a grease pressure has developed which exceeds the opening pressure of the check valves 118. Grease then flows into the downstream slit portions 116", and from there through the channels 120 and the cutout channels 122 to the grease outflow openings at the flattenings 124. This continued transport of lubricating grease to the grease outlet openings is, however, only caused by the pressure of grease coming from the grease press. If the grease press is removed and consequently no pressure is exerted onto the grease within the slit portion 116', the check valves 118 close again. Grease contained in the downstream slit portions 116", the channels 120 and the cutout channels 122 remains on account of its high viscosity. Thus, there will be no afterflow of these grease quantities present downstream of the check valves 118 to the grease outlet openings.

Figure 10:
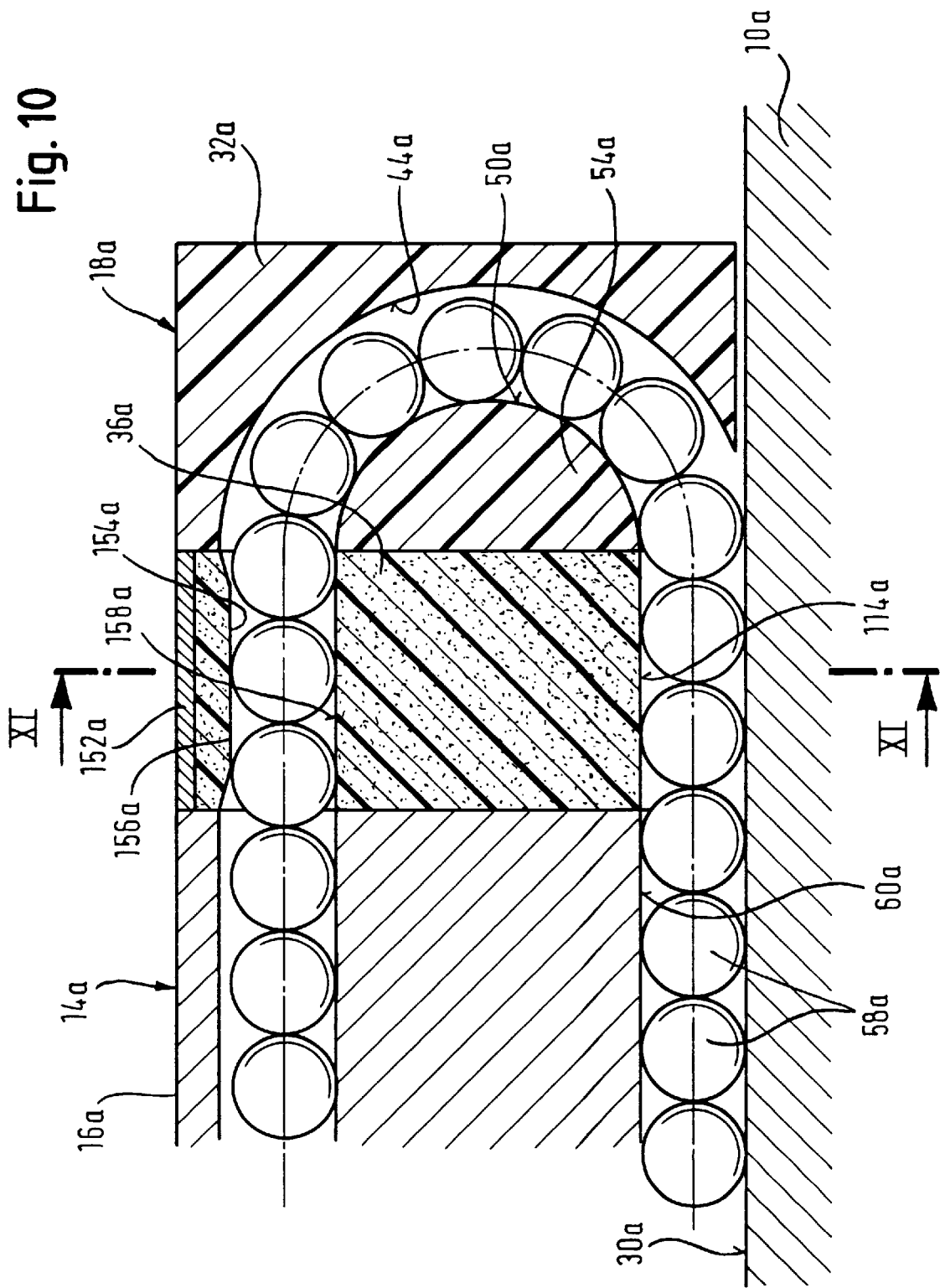
FIG. 10 is a longitudinal section through another example embodiment of the linear guide device of the invention.
Figure 11:
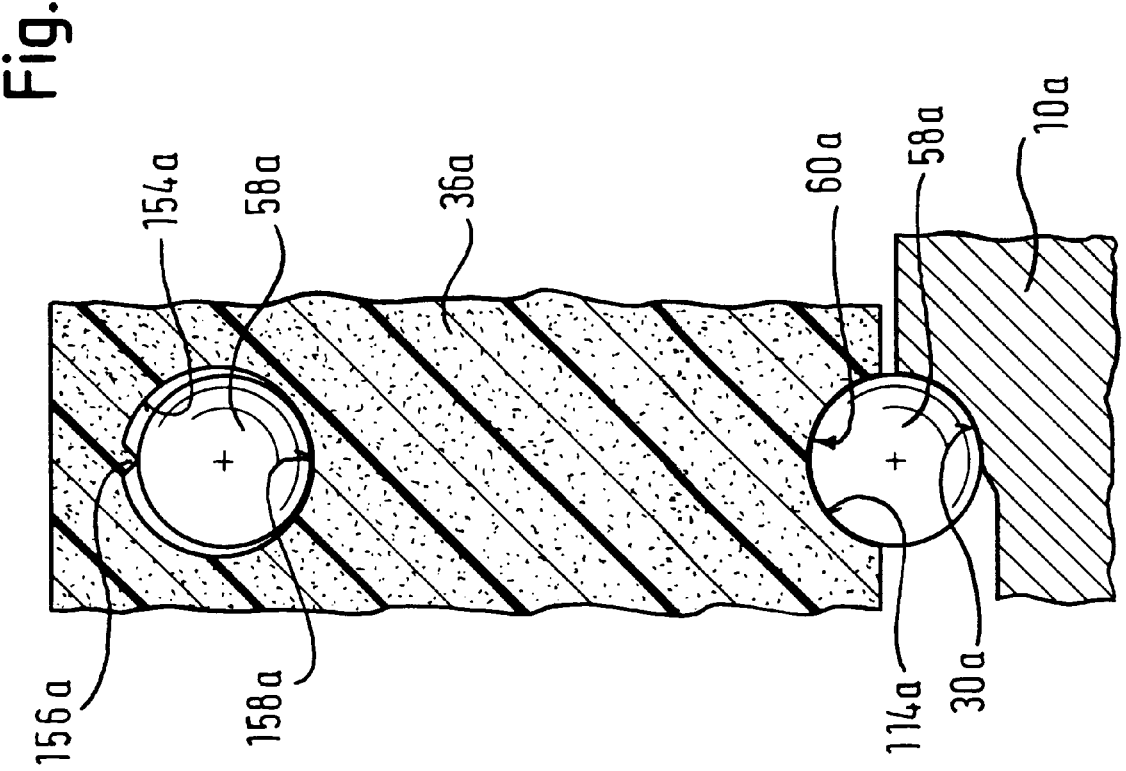
FIG. 11 is a partial cross-sectional view along line the XI—XI of FIG. 10.
Figure 12:
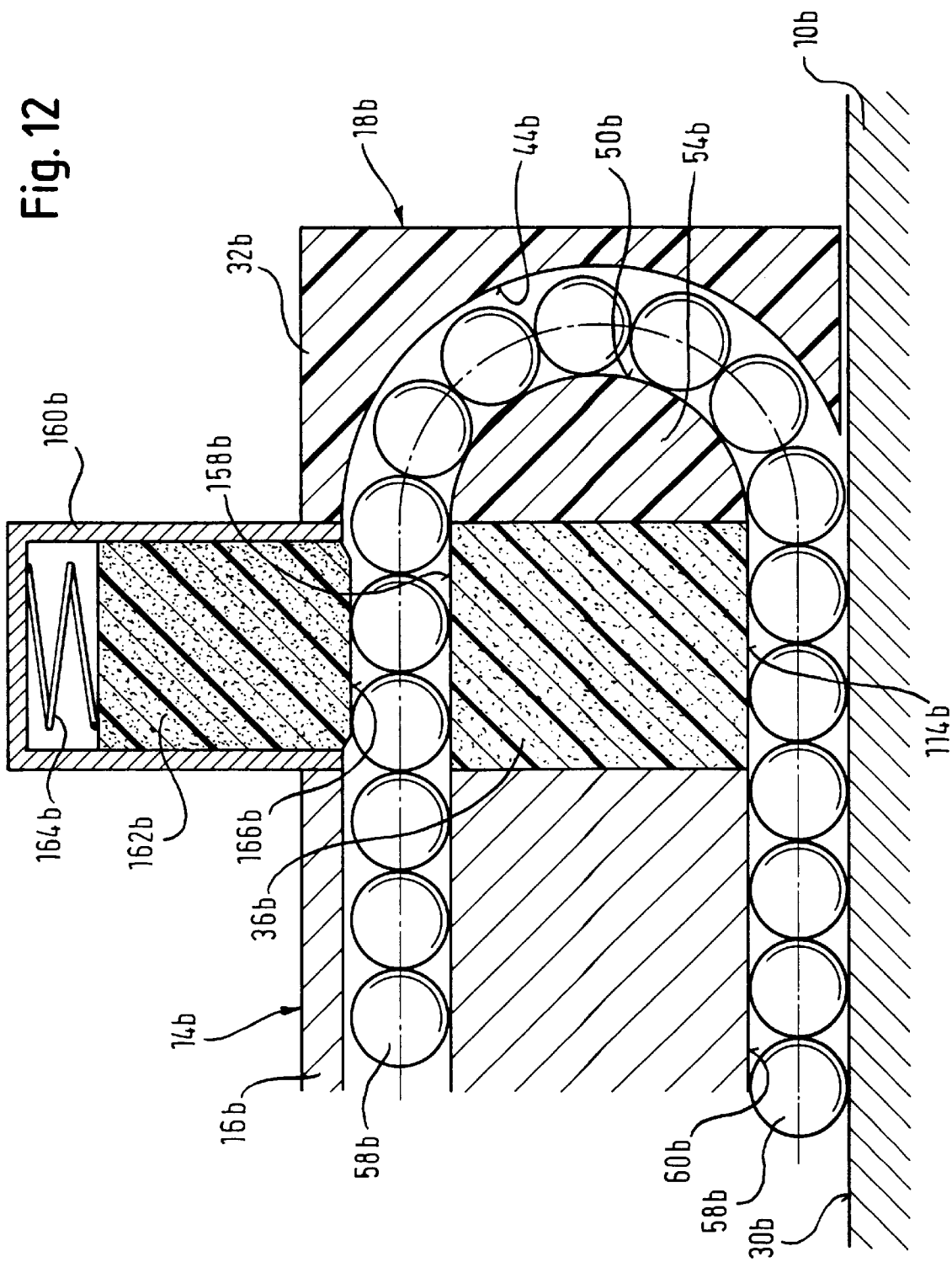
FIG. 12 is a longitudinal section through another example embodiment of the linear guide device of the invention.

In FIGS. 10–12, component parts equal to or similar with those of FIGS. 1–9 are designated by the same reference numerals, however extended by a letter suffix. If hereinafter not mentioned to the contrary, in avoiding repetitions, reference should be had to the comments on FIGS. 1–9. It is understood that features having been described in connection with FIGS. 1–9 but not being shown in FIGS. 10–12 may be employed in the example embodiments of FIGS. 10–12, possibly in a modified manner, and vice versa.

FIG. 10 shows a section made in the plane of a ball loop through one of the flange portions of the guide carriage 14a. The lubrication insert member 36a is U-shaped corresponding to the basic shape of the guide carriage 14a. It does not however form an insert member which, in the example embodiment of FIGS. 1–9, is inserted into a relief-type recess of an intermediate plate. Rather, it forms rather itself a kind of intermediate plate which substantially completely fills up the axial intermediate space between the end unit 32 and the carriage main body 16a.

The lubrication insert member 36a may be a lubricant oil-absorbing capillary member from which the balls 58a lick off lubricating oil without the action of an external lubricating oil pressure. Alternatively, the lubrication insert member 36a may be made of solid lubricant, e.g. of graphite pressed to a plate. Also with such a solid lubricant member, there takes place a lubricant transfer to the balls 58a, if the latter roll along the solid lubricant member. Another alternative provides that the lubrication insert member 36a consists of a material containing a lubricant admixture, e.g. a lubricant-containing polymer member made of a polyethylene base material to which a paraffin base lubricant has been added. With such lubricant-containing polymers, release of lubricant is accomplished in particular due to frictional heat of the balls 58a rolling along the tracks of the circulation space and due to mechanical pressure exerted onto the lubrication insert member 36a. It is understood that the two latter-mentioned alternatives concerning the material of the lubrication insert member 36a are principle also possible for the lubrication insert plate 36 of the example embodiment of FIGS. 19.

Suitably, the lubrication insert member 36a is accommodated in a housing 152a axially disposed between the end unit 32a and the carriage main body 16a, so that flow of lubricant to the outer side of the guide carriage 14a is avoided and the lubrication insert member 36a is protected against external influence. If the lubrication insert member 36a exhibits sufficient inherent stability, it is in principle possible to do without the housing 152a.

Further, it is possible that the lubrication insert member 36a is integral with the reversing member 54a, so that there will be lubrication of the balls 58a not only within the axial end portions of the bearing or/and returning ball rows but also within the region of the arcuate ball rows.

For a description of the contact zones of the lubrication insert member 36a with the balls 58a, additional reference is made to FIG. 11. In FIG. 11, it can be seen that the bearing track 60a of the guide carriage 14a within the axial range of the lubrication insert member 36a is completely formed of the lubricating contact surface 114a. This solution is appropriate if the lubrication insert member 36a consists of a sufficiently loadable material. Alternatively or additionally to a lubrication within the range of the bearing ball row, one may want to provide a lubrication within the range of the returning ball row. Then, the lubrication insert member 36a comprises a return bore 154a which is completely enclosed by the lubrication insert member 36a and flushingly joins to the ball return channel of the carriage main body 16a and to the reversing torus of the end unit 32a. The return bore 154a is a bit larger in dimension than the ball crosssection. A lip-type projection 156a projects at a peripheral point into the return bore 154a and presses the returning balls 58a under slight elastic bias against a lubrication contact surface 158a diametrically opposite to the projection 156a. The lip-type projection 156c is dimensioned and sufficiently flexible such that the balls 58a can pass through the return bore 154 substantially unobstructed, but such that, at the same time, within the region of the lubrication contact surface 158a the returning balls 58a are safely and extensively pressed against the peripheral wall of the return bore 154a. Thus, an efficient and sufficient lubrication of the balls 58a is safeguarded. In particular, if a small mechanical pressure is required in order to cause the removal of lubricant from the material structure of the lubrication insert member 36a, this mechanical pressure can easily be applied by means of the lip-type projection 156a.

FIG. 12 shows an example embodiment modified with respect to FIGS. 10 and 11. FIG. 12 shows a housing 160b between the end unit 32b and the carriage main body 16b; this housing stores additional lubricant. In the example embodiment of FIG. 12, this additional lubricant consists of an additional lubrication member 162b which is biassed by means of a biassing spring 164b againgt the returning balls 58b and is by a lubricating surface 166b in lubricating contact with the returning balls. The additional lubrication member 162b is suitably made of the same material as the lubrication insert member 36b and follows the same lubrication principle. The housing 160b can be removed from the guide carriage 14b without having to demount the end unit 32b, so that it is easy to exchange the additional lubrication member 162b if the lubricating capacity thereof is exhausted or if—due to changed conditions of employment of the linear guide device, such as changed working temperatures—a lubrication member of another lubricant composition will be used. If a lubrication of the balls 58b with oil is desired, the housing 160b may also be used for the storing a quantity of free lubricating oil which is in communication (not shown in detail) with the lubrication insert member 36b, so that continuous supply of fresh lubricating oil to the lubrication insert member 36b is guaranteed.

What is claimed is:

1. A linear guide device, comprising:

a guide rail having a longitudinal axis, at least one guide carriage guided on said guide rail in the direction of said longitudinal axis by means of at least one rolling member loop circulating in a circulation space of said guide carriage, said rolling member loop including a bearing row of rolling members in simultaneous engagement with a bearing track of said guide rail and a bearing track of said guide carriage, further a returning row of rolling members and two arcuate rows of rolling members, said guide carriage comprising a carriage main body in the longitudinal region of said bearing row of rolling members and end units at the axially spaced ends of said carriage main body, reversing guides for said arcuate rows of rolling members being formed at least partly on said end units, a lubricant demand existing on at least a part of the roll surfaces of the linear guide device, a lubricant path system being provided in said guide carriage for satisfying said lubricant demand, said lubricant path system extending from a lubricant supply space of said guide carriage to roll surfaces, said lubricant path system being accommodated at least in part in a boundary region between at least one end unit and said carriage main body, wherein a lubricating oil supply line, which is connected to said lubricant supply space and extends at least in part in said boundary region approximately in circumferential direction of said guide rail, is formed at least on a part of its length of a lubricating oil supply capillary line which supplies lubricating oil irrespective of a pressure difference, said lubricating oil supply capillary line being in licking contact with rolling members of said at least one rolling member loop or with said bearing track of said guide rail in at least one licking region.

2. The linear guide device of claim 1, wherein said guide carriage is substantially U-shaped and has a web portion adjacent a top surface of said guide rail and flange portions each adjacent a side surface of said guide rail, wherein between each of said flange portions and the respective side surface of said guide rail there is located said bearing row of rolling members of at least one rolling member loop and wherein said lubricant oil supply line extends along said web portion and said flange portion in correspondence to said U-shape.

3. The linear guide device of claim 2, wherein said lubricant oil supply capillary line extends approximately over the length of said flange portion.

4. The linear guide device of claim 3, wherein said lubricating oil supply capillary line extends also at least over a part of said web portion.

5. The linear guide device of claim 2, wherein said lubricating oil supply capillary line comprises a line section substantially extending according to a U-shape, said line section extending from said bearing row of rolling members of said at least one rolling member loop of said one flange portion to said bearing row of rolling members of said at least one rolling member loop of said other flange portion.

6. The linear guide device of claim 2, wherein said lubricant supply space is disposed in said web portion of said U-shaped guide carriage.

7. The linear guide device of claim 1, wherein said licking region extends over at least a substantial part of the length of at least one of said bearing and returning rows of rolling members.

8. The linear guide device of claim 7, wherein said licking region is formed of a track surface of said circulation space.

9. The linear guide device of claim 1, wherein said lubricant path system is accommodated at least in part in an intermediate plate unit which is disposed between an axial end of said carriage main body and the associated end unit.

10. The linear guide device of claim 9, wherein said intermediate plate unit is formed at least in part of an oil-tight material.

11. The linear guide device of claim 9, wherein said intermediate plate unit abuts on at least one of said carriage main body and said end unit in an oil-tight manner.

12. The linear guide device of claim 9, wherein said intermediate plate unit has a recess for accommodating at least in part said lubricating oil supply capillary line.

13. The linear guide device of claim 12, wherein said recess, at least on a part of its length extending in circumferential direction of said guide rail, is substantially entirely filled with said lubricating oil supply capillary line.

14. The linear guide device of claim 12, wherein said recess is formed in said intermediate plate unit in a relief-type manner and is opened towards said carriage main body.

15. The linear guide device of claim 12, wherein said recess has communication openings through which it communicates with said lubricant supply space.

16. The linear guide device of claim 9, wherein an inner arcuate reversing surface for the respective arcuate row of rolling members is formed on said intermediate plate unit.

17. The linear guide device of claim 14 or 16, wherein said inner arcuate reversing surface is disposed on a side of said intermediate plate unit opposite to said relief-type recess.

18. The linear guide device of claim 2, wherein a plurality of rolling member loops is provided in at least one of said flange portions of said guide carriage and said lubricating oil supply capillary line is in licking contact with rolling members of a plurality of rolling member loops.

19. The linear guide device of claim 1, wherein said lubricant path system comprises a lubricating grease supply line from said lubricant supply space to at least one lubricating grease outlet structure, said lubricating grease supply line terminating into said circulation space or said track of said guide rail at said lubricating grease outlet structure.

20. The linear guide device of claim 19, wherein said lubricating grease supply line and said lubricating oil supply capillary line extend parallel to each other at least on a part of their length, said lubricating oil supply capillary line forming at least a part of a cross-sectional periphery of said lubricating grease supply line.

21. The linear guide device of claim 20, wherein said lubricating grease supply line extends at least on a part of its length in a slit of said lubricating oil supply capillary line.

22. The linear guide device of claim 19, wherein said lubricating oil supply capillary line is accommodated at least in part in an intermediate plate unit which forms an inner reversing member in the region of an arcuate row of rolling members, said lubricating grease supply line, in prolongation of a line section thereof which is at least partly confined by said lubricating oil supply capillary line, being prolongated within said reversing member up to at least one lubricating grease outlet structure.

23. The linear guide device of claim 22, wherein said reversing member is common to a plurality of rolling member loops, said lubricating grease supply line being branched off towards a plurality of rolling member loops within said reversing member.

24. The linear guide device of claim 23, wherein said reversing member comprises a lubricating grease outlet structure between two adjacent reversing surfaces for adjacent rolling member loops.

25. The linear guide device of claim 19, wherein said lubricating grease supply line comprises a shut-off portion upstream of said lubricating grease outlet structure and openable by lubricating grease pressure.

26. The linear guide device of claim 1, wherein said guide carriage comprises a plurality of lubricant introduction terminals which can be selectively used for introduction of lubricant, a valve member being allocated to each of individual ones or groups of said lubricant introduction terminals, said valve members being independent from one another such that when applying a predetermined lubricant introduction pressure to one of said lubricant introduction terminals only the respective allocated valve member opens.

27. The linear guide device of claim 26, wherein said valve members are mounted on at least one of an end unit and an intermediate plate unit arranged between said end unit and said carriage main body.

28. The linear guide device of claim 27, wherein said valve members are made of the same material as said end unit and said intermediate plate unit, respectively.

29. The linear guide device of claim 1, wherein said guide carriage comprises lubricant introduction means connected to said lubricant supply space.

30. The linear guide device of claim 29, wherein said lubricant supply space may be selectively charged with lubricating oil or lubricating grease through a common lubricant introduction means.

31. The linear guide device of claim 29, wherein said lubricant introduction means is mounted on an end unit of said guide carriage.

32. The linear guide device of claim 23, wherein a lubricant introduction means comprises a plurality of lubricant introduction terminals on a plastics member, an armouring member, being mounted on said plastics member, said armouring member comprising connection components for said lubricant introduction terminals.

33. The linear guide device of claim 32, wherein said connection components are formed as internal screw thread sockets which each are aligned with a respective connection bore of said lubricant introduction terminals.

34. A linear guide device, comprising:
a guide rail having a longitudinal axis,
at least one guide carriage guided on said guide rail in the direction of said longitudinal axis by means of at least one rolling member loop circulating in a circulation space of said guide carriage,
said rolling member loop including a bearing row of rolling members in simultaneous engagement with a bearing track of said guide rail and a bearing track of said guide carriage, further a returning row of rolling members and two arcuate rows of rolling members,
said guide carriage comprising a carriage main body in the longitudinal region of said bearing row of rolling members and end units at the axially spaced ends of said carriage main body,
reversing guides for said arcuate rows of rolling members being formed at least partly on said end units,
a lubricant demand existing on at least a part of the roll surfaces of the linear guide device,
a lubricant path system being provided in said guide carriage for satisfying said lubricant demand,
said lubricant path system extending from a lubricant supply space of said guide carriage to roll surfaces,
wherein a lubricating oil supply line and a lubricating grease supply line are connected to said lubricant supply space, said lubricating oil supply line on at least a part of its length being formed of a lubricating oil supply capillary line which supplies lubricating oil irrespective of a pressure difference, said lubricating oil supply capillary line being in licking contact with rolling members of said at least one rolling member loop or with said bearing track of said guide rail in at least one licking region, said lubricating grease supply line terminating into said circulation space or said bearing track of said guide rail in the region of at least one lubricating grease outlet structure, a shut-off structure being provided in said lubricating grease supply line upstream of said lubricating grease outlet structure, said shut-off structure being openable by lubricating grease pressure.

35. The linear guide device of claim 34, wherein said lubricating oil supply capillary line extends over at least a substantial part of the length of said lubricating oil supply line between said lubricant supply space and said licking region.

36. The linear guide device of claim 34, wherein said licking region extends over at least a substantial part of the length of at least one of said bearing and said returning rows of rolling members.

37. The linear guide device of claim 34, wherein said lubricating oil supply capillary line is effective for preventing any free flow of lubricating oil or lubricating grease to said licking region due to a pressure difference.

38. The linear guide device of claim 34, wherein said lubricating grease supply line is substantially unthrottled in its portion downstream of said shut-off structure.

39. A linear guide device, comprising:
a guide rail having a longitudinal axis,
at least one guide carriage guided on said guide rail in the direction of said longitudinal axis by means of at least one rolling member loop circulating in a circulation space of said guide carriage,
said rolling member loop including a bearing row of rolling members in simultaneous engagement with a bearing track of said guide rail and a bearing track of said guide carriage, further a returning row of rolling members and two arcuate rows of rolling members,
said guide carriage comprising a carriage main body in a longitudinal region of said bearing row of rolling members and end units at axially both sides of said carriage main body,
reversing guides for said arcuate rows of rolling members being formed at least in part on said end units,
a lubricant supply system being provided in said guide carriage,
said lubricant supply system extending towards lubricant demand zones and being accommodated at least in part within a boundary region between at least one end unit and said carriage main body, wherein a lubricant supply portion of said lubricant supply system, which extends at least in part in said boundary region approximately in circumferential direction of said guide rail, is formed at least on a part of its length of a lubricating structure made of a lubricant retaining material, said lubricating structure comprising a lubricant releasing portion in wetting engagement with at least one of rolling members of said at least one rolling member loop and surface portions of said guide rail, said lubricating structure being made of an absorbent material which supplies lubricating oil by means of capillary action.

40. The linear guide device of claim 39, wherein said guide carriage is substantially U-shaped having a web portion adjacent a top surface of said guide rail and flange portions each adjacent a respective side surface of said guide rail, wherein between each of said flange portions and the respective adjacent side surface there is located the bearing row of rolling members of at least one rolling member loop and wherein said lubricating structure extends approximately over the length of each of said flange portions.

41. The linear guide device of claim 40, wherein said lubricating structure is U-shaped and extends also over at least a part of said web portion.

42. The linear guide device of claim 39, wherein a portion of said reversing guide for an arcuate row of rolling members is formed on said lubricating structure.

43. A linear guide device, comprising:
a guide rail having a longitudinal axis,
at least one guide carriage guided on said guide rail in the direction of said longitudinal axis by means of at least one rolling member loop circulating in a circulation space of said guide carriage,
said rolling member loop including a bearing row of rolling members in simultaneous engagement with a bearing track of said guide rail and a bearing track of said guide carriage, further a returning row of rolling members and two arcuate rows of rolling members,
said guide carriage comprising a carriage main body in a longitudinal region of said bearing row of rolling members and end units at axially both sides of said carriage main body,
reversing guides for said arcuate rows of rolling members being formed at least in part on said end units,
a lubricant supply system being provided in said guide carriage,
said lubricant supply system extending towards lubricant demand zones and being accommodated at least in part within a boundary region between at least one end unit and said carriage main body, wherein a lubricant supply portion on said lubricant supply system, which extends at least in part in said boundary region approximately in circumferential direction of said guide rail, is formed at least on a part of its length of a lubricating structure made of a lubricant retaining material, said lubricating structure comprising a lubricant releasing portion in wetting engagement with at least one of rolling members of said at least one rolling member loop and surface portions of said guide rail, said lubricant releasing portion of said lubricating structure forming at least a part of at least one of said bearing track of said guide carriage and a return guide for said returning row of rolling members.

44. A linear guide device, comprising:

a guide rail having a longitudinal axis, at least one guide carriage guided on said guide rail in the direction of said longitudinal axis by means of at least one rolling member loop circulating in a circulation space of said guide carriage, said rolling member loop including a bearing row of rolling members in simultaneous engagement with a bearing track of said guide rail and a bearing track of said guide carriage, further a returning row of rolling members and two arcuate rows of rolling members, said guide carriage comprising a carriage main body in a longitudinal region of said bearing row of rolling members and end units at axially both sides of said carriage main body, reversing guides for said arcuate rows of rolling members being formed at least in part on said end units, a lubricant supply system being provided in said guide carriage, said lubricant supply system extending towards lubricant demand zones and being accommodated at least in part within a boundary region between at least one end unit and said carriage main body, wherein a lubricant supply portion of said lubricant supply system, which extends at least in part in said boundary region approximately in circumferential direction of said guide rail, is formed at least on a part of its length of a lubricating structure made of a lubricant retaining material, said lubricating structure comprising a lubricant releasing portion in wetting engagement with at least one of rolling members of said at least one rolling member loop and surface portions of said guide rail, said guide carriage comprising a press lip structure protruding into said circulation space and preferentially being elastic, said press lip structure urging said rolling members into contact with said lubricant releasing portion.

45. A linear guide device, comprising:

a guide rail having a longitudinal axis, at least one guide carriage guided on said guide rail in the direction of said longitudinal axis by means of at least one rolling member loop circulating in a circulation space of said guide carriage, said rolling member loop including a bearing row of rolling members in simultaneous engagement with a bearing track of said guide rail and a bearing track of said guide carriage, further a returning row of rolling members and two arcuate rows of rolling members, said guide carriage comprising a carriage main body in a longitudinal region of said bearing row of rolling members and end units at axially both sides of said carriage main body, reversing guides for said arcuate rows of rolling members being formed at least in part on said end units, a lubricant supply system being provided in said guide carriage, said lubricant supply system extending towards lubricant demand zones and being accommodated at least in part within a boundary region between at least one end unit and said carriage main body, wherein a lubricant supply portion of said lubricant supply system, which extends at least in part in said boundary region approximately in circumferential direction of said guide rail, is formed at least on a part of its length of a lubricating structure made of a lubricant retaining material, said lubricating structure comprising a lubricant releasing portion in wetting engagement with at least one of rolling members of said at least one rolling member loop and surface portions of said guide rail, said lubricating structure comprising a lubricating member which is resiliently biased into contact with at least one of said rolling members and said surface portions of said guide rail by means of a spring device.

46. The linear guide device of claim 6, wherein said lubricant supply space is disposed in a web portion of at least one end unit.

47. The linear guide device of claim 10, wherein said oil-tight material is a plastics material.

48. The linear guide device of claim 31, wherein said end unit is made of plastics material.

49. The linear guide device of claim 42, wherein said portion of said reversing guide is an inner arcuate reversing surface.

50. The linear guide device of claim 43, wherein said return guide extends at least on a part of its length entirely within said lubricating structure.

51. The linear guide device of claim 44, wherein said press lip structure is subject to the action of a spring device.

52. The linear guide device of claim 43, 44, or 45, wherein said lubricating structure is made of a material the composition of which includes at least a lubricant portion.

53. The linear guide device of claim 43, 44, or 45, wherein said lubricating structure is made of an absorbent material which supplies lubricating oil by means of capillary action.

54. The linear guide device of claim 39, 43, 44 or 45, wherein said lubricating structure is part of an intermediate plate unit which is arranged axially between an axial end of said carriage main body and the respective end unit.

* * * * *

UNITED STATES PATENT AND TRADEMARK OFFICE
CERTIFICATE OF CORRECTION

PATENT NO.  : 6,203,199 B1
DATED       : March 20, 2001
INVENTOR(S) : Pfeuffer

It is certified that error appears in the above-identified patent and that said Letters Patent is hereby corrected as shown below:

Column 2,
Line 2, "the that" should read -- the danger, therefore, that --
Line 5, "availabe" should read -- available --
Line 8, "The" should read -- ¶The --

Column 3,
Line 18, "space at" should read -- space, at --
Line 22, "in case" should read -- in the case --
Line 28, "that in" should read -- that, in --
Line 40, "farly" should read -- fairly --
Line 51, "is" should read -- is, --
Line 52, "however" should read -- however, --
Line 60, "lubricaton" should read -- lubrication --

Column 4,
Line 7, "afore-mentioned" should read -- aforementioned --
Line 8, "U-shaped" should read -- U-shaped, --
Line 9, "a and" should read -- and a --
Line 18, "desired" should read -- desired, --
Line 44, "accomodated" should read -- accommodated --
Line 45, "shown" should read -- been shown --
Line 49, "thereby" should read -- is thereby --
Line 50, "is" should be deleted
Line 51, "part;" should read -- part, --
Line 55, "circulation" should read -- circulation --
Line 59, "space so," should read -- space, so --
Line 60, "unsmootheness" should read -- unsmoothness --

Column 5,
Line 15, "space preferably" should read -- space, preferably --
Line 59, "of" should be deleted Column 6,
Line 13, "and" should read -- and, --
Line 13, "furthermore" should read -- furthermore, --
Line 66, "portion" should read -- portion, --

UNITED STATES PATENT AND TRADEMARK OFFICE
CERTIFICATE OF CORRECTION

PATENT NO. : 6,203,199 B1
DATED : March 20, 2001
INVENTOR(S) : Pfeuffer

It is certified that error appears in the above-identified patent and that said Letters Patent is hereby corrected as shown below:

Column 7,
Line 7, "introducton" should read -- introduction --
Line 26, "principle possible" should read -- principle, it is possible --
Line 57, "sockets each" should read -- sockets, each --

Column 8,
Line 29, "greate" should read -- grease --

Column 9,
Line 11, "in circumferential" should read -- in the circumferential --
Line 19, "action; so, the" should read -- action, so the --
Line 35, "on" should read -- upon --
Line 36, "rail lubricant" should read -- rail, lubricant --
Line 38, "liquified" should read -- liquefied --
Line 39, "form-of" should read -- form of --
Line 43, "respective side" should be deleted
Line 44, "the surfaces" should read -- the respective side surfaces --
Line 65, "In case" should read -- In the case --

Column 10,
Line 5, "close, but" should read -- close by, but --
Line 24, "circulaton" should read -- circulation --
Line 34, "biassed" should read -- biased --
Line 43, "total" should be deleted
Line 45, "of end" should read -- of an end --; and "an" (second occurrence) should read -- a --
Line 65, "explosed" should read -- exploded --

Column 11,
Line 15, " "not shown," " should read -- (not shown ), --
Line 21, "are" (first occurrence) should be deleted
Line 35, "of" should be deleted
Line 38, "screws" should read -- bolts --
Line 38, "afore-mentioned" should read -- aforementioned --
Line 50, "of" should be deleted
Line 52, "sub" should read -- substantially --

UNITED STATES PATENT AND TRADEMARK OFFICE
CERTIFICATE OF CORRECTION

PATENT NO. : 6,203,199 B1
DATED : March 20, 2001
INVENTOR(S) : Pfeuffer

It is certified that error appears in the above-identified patent and that said Letters Patent is hereby corrected as shown below:

Column 12,
Line 4, "56" should read -- 60 --
Line 5, "60" should read -- 56 --
Line 6, "acruate" should read -- arcuate --
Line 14, "hole" should read -- holes --
Line 20, "bols" should read -- bolts --
Line 33, "respective," should read -- respective --
Line 33, "flange" should read -- flanges --
Line 51, "recess, 94" should read -- recess 94, --
Line 54, "each" should be deleted Column 13,
Line 40, "meber" should read -- member --
Line 58, "flushingly" should read -- flush --

Column 14,
Line 23, "down- stream" should read -- downstream --
Line 50, "11 enetrable" should read -- 110 is a barrier impenetrable --
Line 52, "body, 16" should read -- body 16, --

Column 15,
Line 13, "that" should be deleted
Line 52, "hole, whereas lubricating" should read -- hole. Lubricating --

Column 16,
Line 16, "flows" should read -- flow --
Line 33, "lowernext" should read -- next lower --
Line 34, "upper-next" should read -- next higher --
Line 36, "114" should read -- 114, --
Lines 37 and 38, "uppernext" should read -- next higher --
Line 53, "takes" should be deleted
Line 66, "lubricating," should read -- lubricating --

Column 17,
Line 3, "operation however" should read -- operation, however, --
Line 4, "heated" should read -- heated, --
Line 20, "biassed" should read -- biased --
Line 31, "each of to" should read -- to each of --
Line 57, "loop" should read -- loops --

UNITED STATES PATENT AND TRADEMARK OFFICE
CERTIFICATE OF CORRECTION

PATENT NO. : 6,203,199 B1
DATED : March 20, 2001
INVENTOR(S) : Pfeuffer

It is certified that error appears in the above-identified patent and that said Letters Patent is hereby corrected as shown below:

Column 18,
Line 13, "that" should read -- that, --; and "140" should read -- 140, --
Line 14, "40" should read -- 40, --
Line 18, "rail" should read -- rail, --
Line 22, "alignment" should be deleted
Line 34, "nippie" should read -- nipple --
Line 45, "assembied" should read -- assembled --

Column 19,
Line 29, "independendently" should read -- independently --
Line 60, "sufficient" should read -- sufficiently --

Column 20,
Line 9, "nevertheless" (second occurrence) should be deleted
Line 65, "U-shaped" should read -- U-shaped, --
Line 66, "not" should read -- not, --
Line 67, "however" should read -- however, --

Column 21,
Line 2, "rather" should be deleted
Line 16, "base" should read -- based --
Line 23, "principle" should read -- in principle --
Line 25, "FIGS. 19." should read -- FIGS. 1-9. --
Line 52, "flushingly" should read -- flush --
Line 55, "crosssection" should read -- cross section --
Line 60, "156c" should read -- 156a --

Column 22,
Line 7, "16b;" should read -- 16b. --
Line 8, "this" should read -- This --
Line 10, "biassed" should read -- biased --
Line 11, "biassing" should read -- biasing --; and "againgt" should read -- against --
Line 24, "the" (second occurrence) should be deleted

UNITED STATES PATENT AND TRADEMARK OFFICE
CERTIFICATE OF CORRECTION

PATENT NO. : 6,203,199 B1
DATED : March 20, 2001
INVENTOR(S) : Pfeuffer

It is certified that error appears in the above-identified patent and that said Letters Patent is hereby corrected as shown below:

Column 24,
Line 67, "member, being" should read -- member being --

Signed and Sealed this

Seventh Day of May 2002

Attest:

Attesting Officer

JAMES E. ROGAN
Director of the United States Patent and Trademark Office